United States Patent [19]
Bechtel et al.

[11] 3,739,385
[45] June 12, 1973

[54] MECHANICALLY SWEPT RADAR ANTENNA FOR USE WITH AN AIRCRAFT LANDING MONITOR SYSTEM

[75] Inventors: Bartow Bechtel, Richardson; Max B. Green, Dallas, both of Tex.

[73] Assignee: Texas Instruments Incorporated, Dallas, Tex.

[22] Filed: July 15, 1970

[21] Appl. No.: 54,990

[52] U.S. Cl. .............. 343/705, 343/756, 343/766, 343/771, 343/786
[51] Int. Cl...... H01q 1/28, H01q 3/06, H01q 13/02
[58] Field of Search .............. 343/5 R, 5 LS, 5 SC, 343/7 A, 11 R, 13 R, 705, 756, 762, 786

[56] References Cited
UNITED STATES PATENTS

| | | | |
|---|---|---|---|
| 3,146,449 | 8/1964 | Serge et al. | 343/756 X |
| 2,733,437 | 1/1956 | Lyman et al. | 343/11 R |
| 3,110,022 | 11/1963 | Gebhardt | 343/5 R |
| 2,730,717 | 1/1956 | Katchky et al. | 343/756 |
| 2,611,126 | 9/1952 | Irving | 343/11 R |
| 2,617,032 | 11/1952 | Allison | 343/762 |

*Primary Examiner*—Stephen C. Bentley
*Attorney*—James O. Dixon, Andrew M. Hassell and Rene E. Grossman

[57] ABSTRACT

A radar antenna for use in an aircraft landing monitor which includes an elongated antenna housing mounted on a vertical pivot for horizontal oscillation in the nose of an aircraft. An elongated horn reflector mounted along the housing supports a resonant edge-slotted waveguide array therein for transmitting and receiving radar signals with a radar beam pattern narrower in the azimuth than in the elevation plane. An elongated bar spring is mounted in the housing and is rigidly attached to the vertical pivot in order to tend to maintain the desired oscillation of the antenna housing. A motor oscillates the antenna housing about the vertical pivot to sweep the radar beam over a predetermined azimuth angle. Circuitry is provided to sense the position of the antenna housing and for maintaining the antenna sweep at the predetermined azimuth angle and rate.

18 Claims, 25 Drawing Figures

Patented June 12, 1973

MECHANICALLY SWEPT RADAR ANTENNA FOR USE WITH AN AIRCRAFT LANDING MONITOR SYSTEM

This invention relates to radar, and more particularly to the use of a mechanically swept radar antenna having a traveling wave edge-slotted waveguide array therein for transmitting and receiving radar signals in an independent aircraft landing monitor system.

A number of aircraft guidance systems have previously been developed for assisting the landing of aircraft. However, the advent of large, high speed jet passenger aircraft and the development of automatic landing systems, such as flight director systems, have resulted in the need for an onboard aircraft landing monitor which is independent of ground-based electronic guidance equipment to enable the pilot to progressively monitor the final aircraft approach, touchdown and rollout. Specifically, the need has arisen for an onboard independent landing monitor which provides the pilot with positive assurance that the aircraft localizer approach is valid, that the aircraft's true position relative to the runway center line and threshold is satisfactory and that the airport runway is clear of obstructions. Such an independent landing monitor is particularly desirable during blind or low visibility aircraft takeoffs or landings, and during landings at airports which are unequipped or underequipped with navigational aids.

Radar systems have previously been utilized onboard aircraft for such uses as terrain and aircraft avoidance. However, previously developed aircraft radar systems have not been generally useful as independent landing monitors, due to antenna resolution deficiencies and because the radarscope display of such prior systems provides a distorted view of the runway shape. The resulting inaccurate runway display of such prior radar systems has made it extremely difficult for a pilot to make meaningful landing decisions such as identifying runway and taxiways, and accurately determining the aircraft angle to the runway center line. For instance, a conventional planned position indicator (PPI) radar display provides range and angle presentation of an approaching runway. However, this display is totally inadequate for use in a precision aircraft approach, as the display presents a "birds eye" view of the runway which does not give an aircraft pilot a sense of altitude, provides no sense of urgency for landing and makes for a difficult transition to a visual inspection of the approaching runway. Additionally, the conventional B-scope and delayed B-scope presentation, wherein range is plotted against an independent variable scan angle, provides adequate identification of runway patterns at long range where the angular distortion is minimal, but provides extreme distortion of the runway at the minimum decision altitude during an aircraft landing, thereby preventing the pilot from accurately identifying the runway and taxiways and making it impossible to accurately determine the aircraft angle to the runway center line.

In accordance with the present invention, a short range, high resolution mapping radar system is located onboard an aircraft and is independent of ground-based electronic equipment to monitor runway alignment and the like during approach, touchdown and rollout phases of aircraft landing. The present system utilizes a high resolution antenna system in combination with a visual radar display which presents a "real-world" display of the approaching runway to the pilot on a one-to-one correspondence to real-world perspective. The pilot may then accurately identify the runway threshold, accurately determine the angle to center of the runway, measure lateral offset and make a smooth transition to visual runway information.

In accordance with the present invention, an aircraft landing monitor radar antenna includes an elongated housing for being mounted horizontally in an aircraft. An elongated horn reflector extends along a forward portion of the housing and supports therein a radar waveguide for transmitting and receiving radar signals with an antenna radiation pattern narrower in the azimuth than in the elevation. A motor is connected to oscillate the housing horizontally about a central vertical axis to sweep the antenna over a desired azimuth angle for airport runway detection.

In accordance with another aspect of the invention, a radar antenna for use in an independent aircraft landing monitor includes an elongated antenna housing mounted on a vertical pivot for horizontal oscillation in an aircraft. An elongated horn reflector is mounted along the housing and includes therein an edge-slotted waveguide array for transmitting and receiving radar signals with a radiation pattern narrower in the azimuth than in the elevation plane. Structure is also mounted in the horn reflector forward of the waveguide for circularly polarizing the radar signals. A spring is mounted between the antenna housing and the vertical pivot for periodically storing and releasing energy during oscillation of the antenna housing. A motor is provided to oscillate the antenna housing about the vertical pivot for sweeping the radiation pattern over a predetermined azimuth angle. Circuitry senses the position of the antenna housing and maintains the antenna sweep at the predetermined azimuth angle.

In accordance with yet another aspect of the invention, a mechanically swept radar antenna for use in an aircraft landing monitor includes an antenna housing mounted for pivotal movement about a vertical axis on an aircraft. An elongated waveguide array extends along the length of the housing for directing a radar beam narrower in the azimuth than in the elevation plane. A motor oscillates the housing about the vertical axis for sweeping the radar beam across a predetermined azimuth angle sufficient for airport runway detection during glideslope approach by the aircraft. Circuitry generates an electrical representation of the antenna housing position and also generates an error signal in response to comparison of the amplitude of the electrical signal against a preset level. Circuitry is responsive to the error signal for driving the motor means to maintain the desired sweep of the antenna housing.

For a more complete understanding of the invention and for further objects and advantages thereof, reference may now be made to the following description taken in conjunction with the accompanying drawings, in which:

FIG. 8 is a perspective view of a portion of the slotted waveguide assembly utilized in the antenna shown in FIG. 5;

Figure 20:
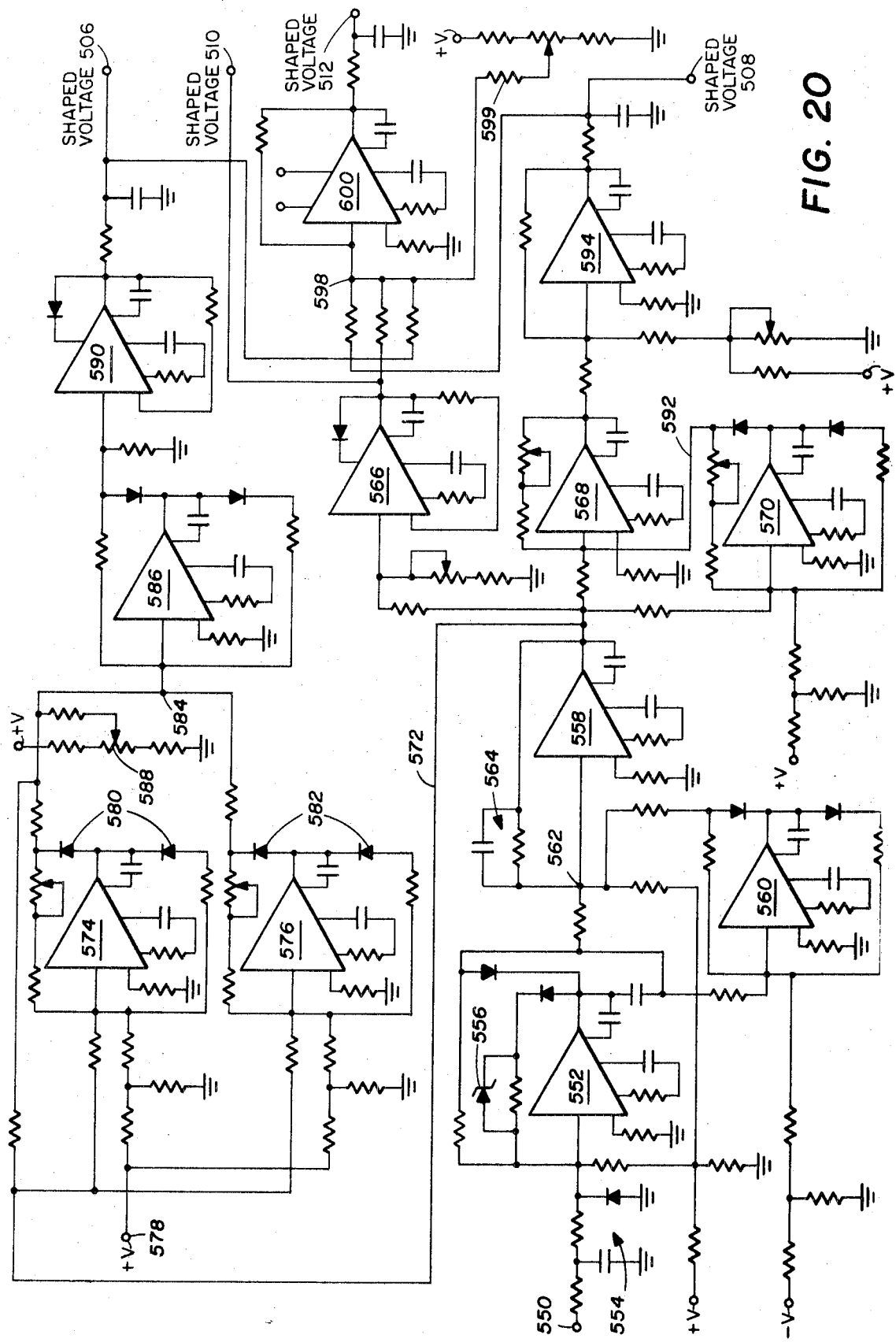
Figure 21:
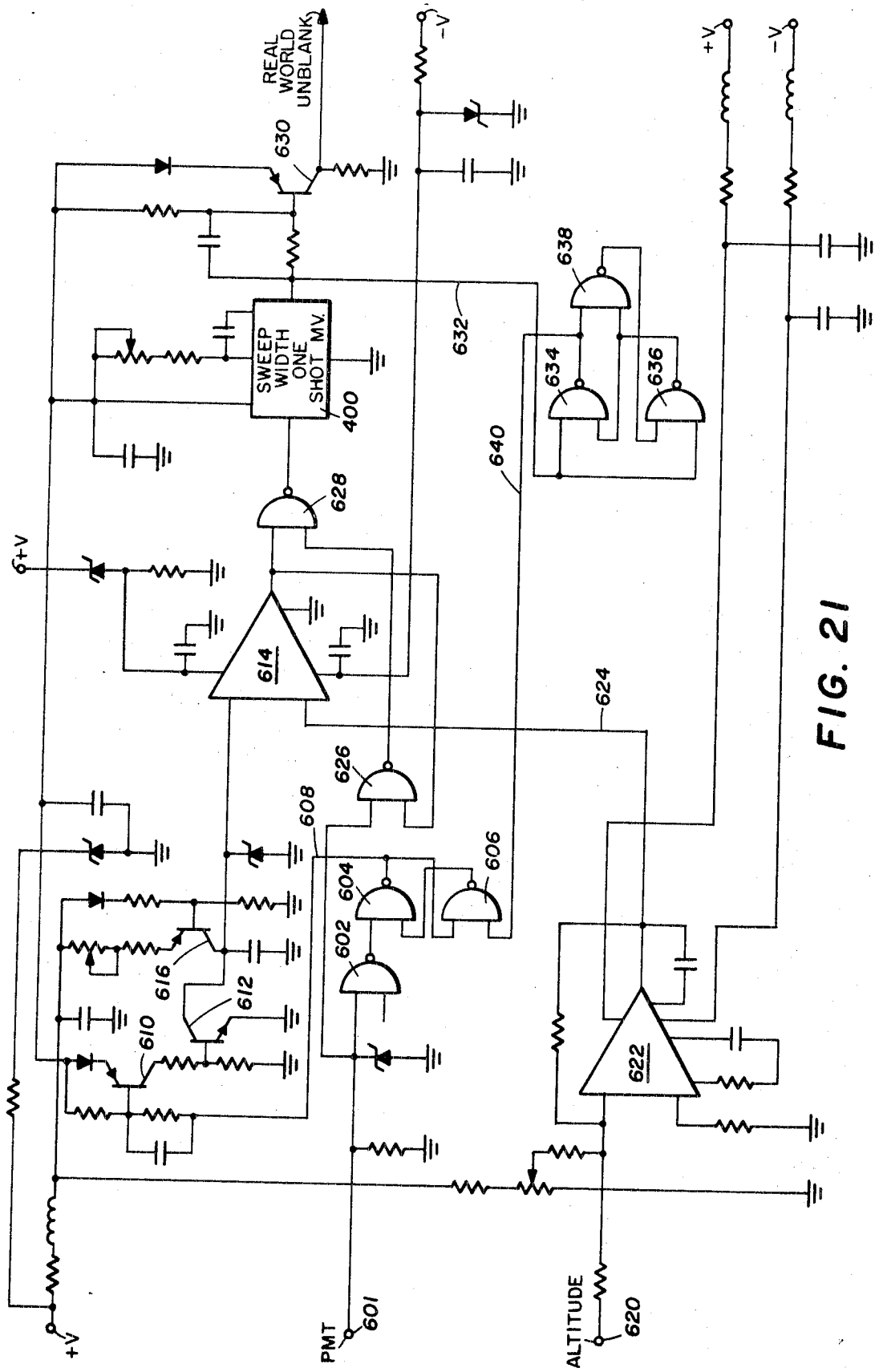
Figure 22:
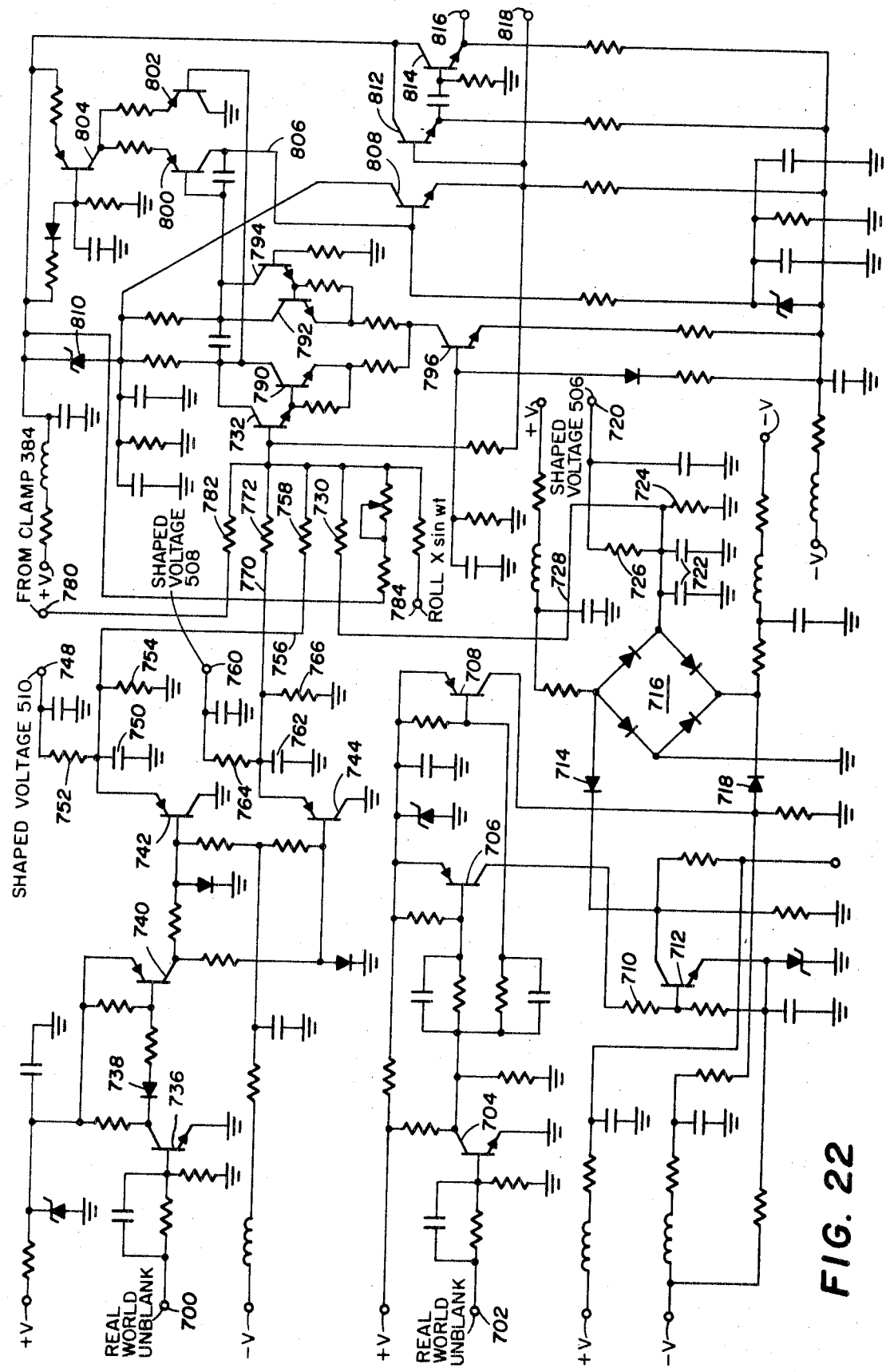

FIGS. 19a–d are somewhat idealized illustrations of the present radarscope display during approach to an airport runway;

FIG. 20 is a detailed schematic of the nonlinear voltage generators in the sweep generator circuit of the invention;

FIG. 21 is a detailed schematic of the delay circuitry for generation of the unblank signal for use in the sweep generator of the invention; and FIG. 22 is the detailed schematic of the storage, clamping and summing circuits utilized in the sweep generator circuit of the invention.

Figure 1:
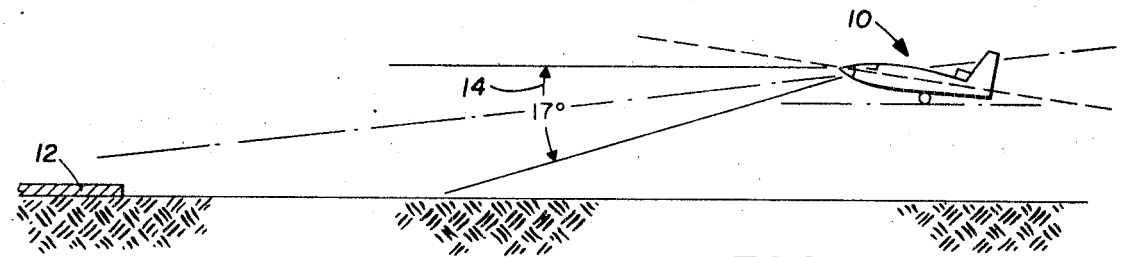
FIG. 1 is a somewhat diagrammatic illustration of the antenna radiation pattern of the invention in the elevation plane during glideslope approach.
Figure 2:
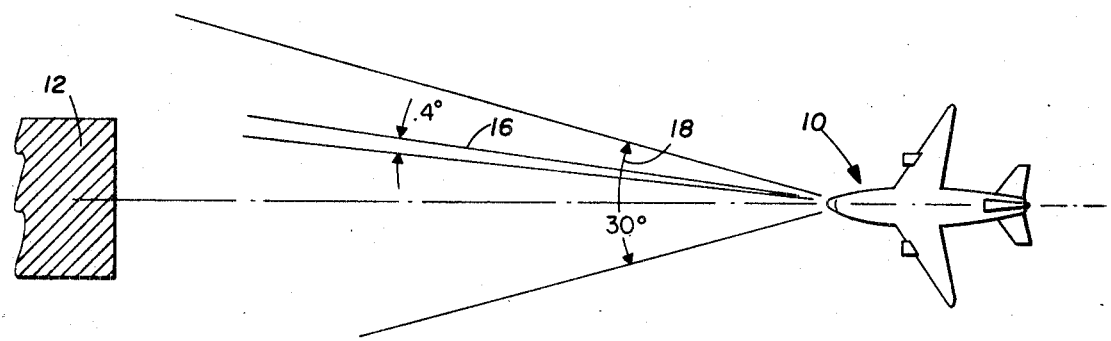
FIG. 2 is a somewhat diagrammatic illustration of the azimuth sweep of the antenna radiation pattern of the present system.

Referring to the figures, FIGS. 1 and 2 somewhat diagrammatically illustrate the basic operation of the present landing monitor system. An aircraft 10 is illustrated in a landing attitude during a glideslope approach toward an airport runway 12. As shown in FIG. 1, a radar beam is transmitted from the nose of the aircraft 10 with an elevational antenna beam width 14 of about 17°. As shown in FIG. 2, the azimuth antenna beam width 16 is approximately 0.4° and is continuously swept over an azimuth sweep angle 18 of approximately 30°. The swept antenna beam configuration provided by the system enables high resolution radar mapping of the approaching runway 12 during landing of the aircraft 10. Radar reflection signals from the runway 12 and the grass and terrain surrounding the runway are received by radar receiving circuitry in the nose of the aircraft 10 and the runway 12 is displayed in real-world perspective to the pilot.

In the preferred embodiment of the invention, a maximum range of about five miles, with a range of about 2 miles for initial runway acquisition, is afforded to the landing monitor radar system. Aircraft 10, landing with typical glideslope angles of from 2.5° to 3.0°, will thus be about 2,600 feet from the end of the runway 12 at an altitude of 200 feet and about 1,200 feet from the runway 12 at a decision altitude of 100 feet.

Figure 3:
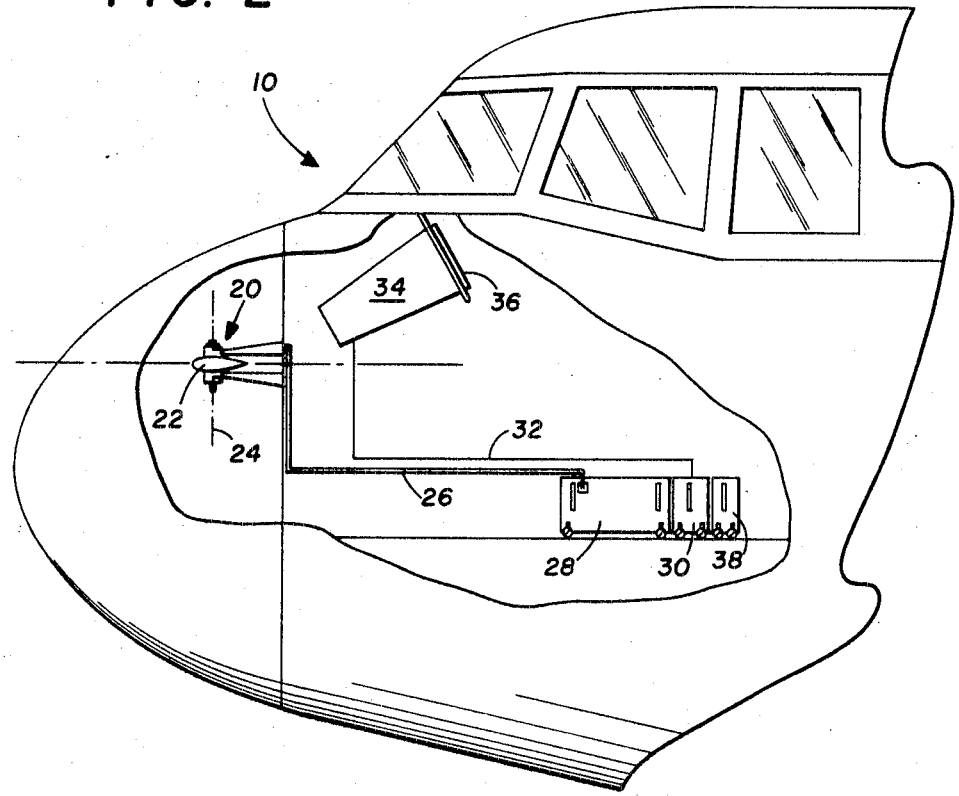
FIG. 3 is a somewhat diagrammatic illustration of the installation of the present landing monitor radar system in the nose of an aircraft.

FIG. 3 is a cutout view of the nose portion of a conventional aircraft to illustrate the basic components of the present landing monitor system. A mechanically swept antenna 20 is located in the nose of the aircraft and comprises an elongated edge-slotted waveguide array 22 which is reciprocated about a vertical axis 24. As may be seen from FIG. 2, the antenna 20 is periodically swept 15° on either side of the longitudinal axis of the aircraft 10 to provide the 30° sweep angle 18. In the preferred embodiment, antenna 20 is swept at a rate of 2.5 cycles per second.

Pulsed radar signals are transmitted via the antenna 20 through suitable waveguide connections 26 which extend from a transmitter-receiver housing 28. The return radar signals are received by receiver circuitry within the housing 28. Sweep generator circuitry is contained within a housing 30 and provides electrical signals via leads 32 to a display monitor radarscope 34 mounted in the instrument panel of the aircraft. Display monitor 34 is preferably of the direct view storage tube type and provides a display surface 36 wherein the pilot may receive a real-world perspective indication of the upcoming runway 12. Display monitor 34 includes various adjustment and select knobs to provide alternative conventional B sweep and PPI display sweep modes if desired. Power supply circuitry for the system is contained within a housing 38.

The present system provides a practical independent landing monitor system for use on large passenger capability jumbo jet aircraft. The present high resolution radar system permits visual assessment to the pilot of the aircraft's alignment with the runway center line during the final phase of approach, even in the event of inclement weather such as rain, snow or fog which provides zero-zero visibility.

Figure 4:
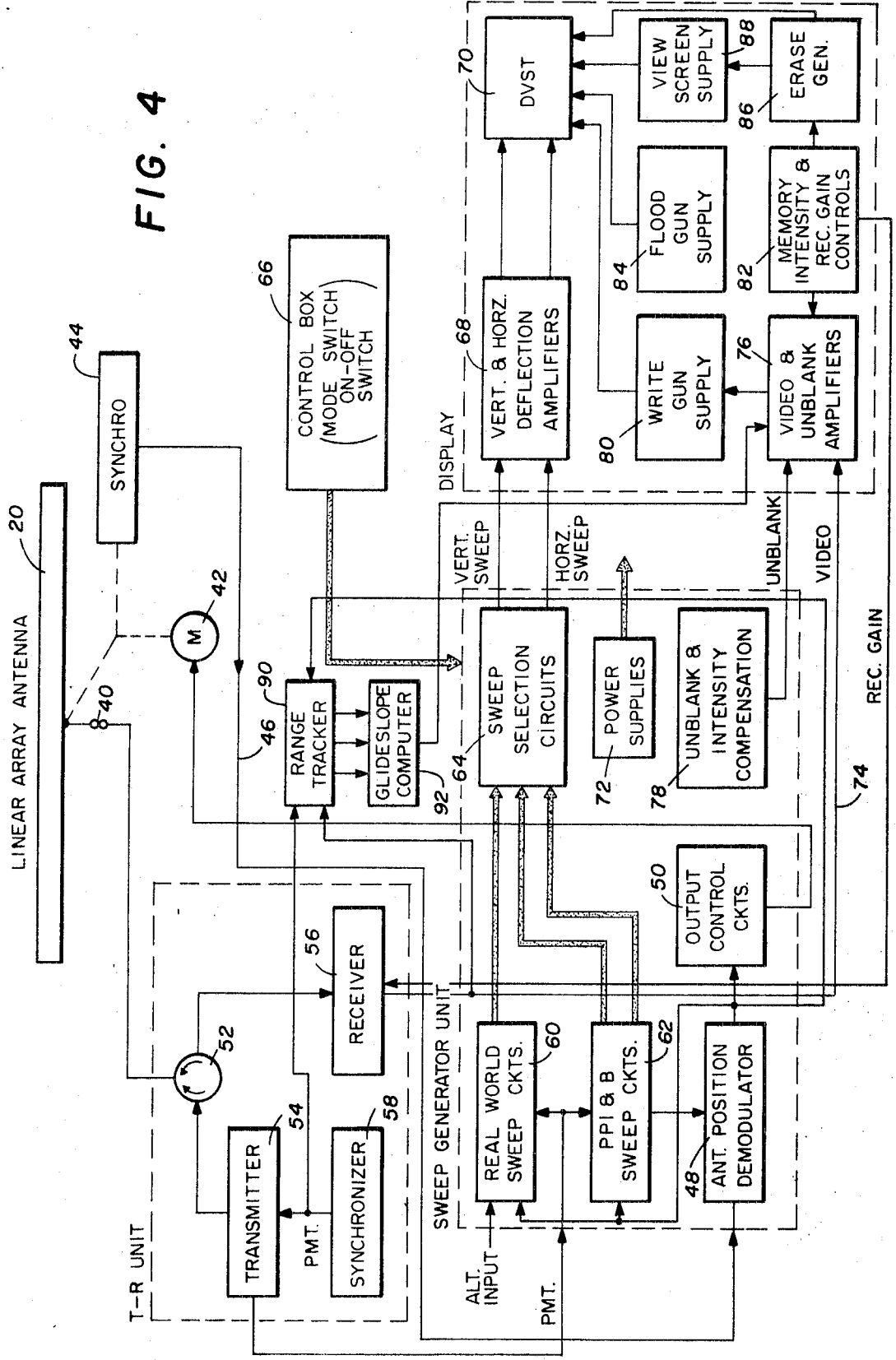
FIG. 4 is a block diagram of the present landing monitor system.

FIG. 4 is a block diagram of the basic independent landing monitor system. The antenna 20 is oscillated about a rotary joint 40 by a torque motor 42. A synchro or control transformer 44 senses the instantaneous position of the antenna 20 and supplies a signal via a lead 46 to an antenna position demodulator circuit 48. The demodulator 48 generates a slowly varying DC voltage which is supplied to an output control circuit 50 which serves to operate upon the duty cycle of voltage pulses supplied to the torque motor 42 in order to maintain the desired oscillation of the antenna 20. For instance, if the oscillation of the antenna 20 begins to decrease in magnitude, the output control circuit 50 drives the torque motor 42 to increase the angle of antenna oscillation.

The antenna 20 is connected through a circulator 52 to a radar transmitter 54 and a radar receiver 56. Circulator 52 operates as a duplexing circuit in order to couple the antenna 20 with either the transmitter 54 or the receiver 56. A synchronizer circuit 58 is connected for control of the transmitter 54, and comprises a clock circuit (not shown) containing an RC oscillator which establishes the PRF for the system. A PMT monostable multivibrator circuit (not shown) is triggered by the clock to set the pulse of the premaster trigger (PMT) of the system. The PMT is fed through buffer circuits to various portions of the system, as will be described later in greater detail.

The PMT is fed from the transmitter 54 to the sweep generator unit and specifically to real-world sweep circuits 60 and PPI and B sweep circuits 62. An altitude input signal representative of the altitude of the aircraft is also fed into the real-world sweep circuit, and outputs are generated for application to sweep selection circuits 64. The sweep selection circuits 64 are controlled by mode switches in a control box 66. When the real-world mode is selected, the real-world sweep circuits 60 drive vertical and horizontal deflection amplifiers 68 to provide a real-world perspective display on the direct view storage tube (DVST) 70. When the PPI mode is selected at the control box 66, the PPI sweep circuits 62 drive the vertical and horizontal deflection amplifiers 68 to provide a plan position indicator display in the well known manner at the DVST 70. When the B sweep selection is made at control box 66, the B sweep circuit 62 operates to drive the vertical and horizontal deflection amplifiers 68 to provide a conventional B sweep indication at the DVST 70. Power is provided to the various portions of the system from suitable power supplies 72.

The receiver 56 is of the quasilog type and generates signals via leads 74 which are applied to video amplifiers 76. An unblank and intensity compensation circuit 78 supplies an unblank signal to the amplifier 76. Amplifier 76 supplies the amplified video and unblanking signals to the write gun supply 80 to control the intensity of the electron writing beam of the DVST 70. The intensity control 82, mounted on the front panel of the display, controls the gain of the unblanking amplifier 76, which in turn controls the brightness of the video information written on the DVST. The memory control 82, also mounted on the front panel of the display, is used to control the persistance (or storage time) of the display. The memory control operates upon the erase generator circuitry 86 and causes it to supply a variable duty cycle pulse train to the backing electrode of the DVST 70. This in turn controls the amount of information erased from the storage surface of the DVST. The erase generator 86 also supplies a pulse, coincident with the erase pulse, to a dunk tube (not shown) which drops the view screen supply 88 voltage to a very low level for the duration of the erase pulse. This eliminates light bursts that would otherwise occur for the erase pulse duration. The flood gun supply 84 provides the necessary voltages to the DVST such that "flooding beam" is properly collimated. The receiver gain control supplies a signal to the receiver 56 to vary the amplitude of the radar video which is supplied to the display.

The DVST 70 is of conventional design, and a suitable tube for use with the invention has a writing speed of 450,000 inches per microsecond and is manufactured and sold by Westinghouse Corporation. Basically, the flood gun of the DVST illuminates a grid which is selectively charged by the write gun of the tube. The tube thus has persistence which is determined by the duty cycle of the erase generator which is pulsed to erase the image on the DVST. The unblanking circuits of the system inhibit the display during the retrace time of the sweeps.

The unblanking circuits enable the display to write video and symbology on the DVST during the active portion of the sweeps. The intensity compensation circuits 78 provide a compensation signal superimposed on the unblanking pedestal pulse to correct for the differences in sweep speed (inches/usec) and the density of radar returns at different areas on the display screen. The use of the DVST 70 is advantageous in the system as the tube supplies an integrating quality. Therefore, weak pulses received by the system tend to be integrated due to the fact that a large number of hits (radar returns) strike the same resolution cell on the screen of the DVST.

A range tracker system 90 receives the PMT from synchronizer 58, the radar video from receiver 56, and the antenna position signal from demodulator 48. The range tracker system previously developed. indications of the range of the aircraft to runway touchdown. In the preferred embodiment, a plurality of passive reflectors are arranged adjacent the airport runway in a predetermined pseudorandom coded configuration, and the tracker system 90 detects radar reflections from the reflectors to accurately determine the aircraft range to the reflectors. This range tracker system 90 is described in detail in the copending patent application Ser. No. 055,165, filed July 15, 1970, and entitled "Range Tracking System for Use In An Independent Aircraft Landing Monitor."

The range information generated by tracker 90 is fed to the amplifiers 76 for display to the pilot on the DVST 70. The range information is also fed to a glideslope computer 92 which detects the relative amplitudes of radar signals reflected from predetermined reflectors adjacent the runway to generate indications of the position of the aircraft relative to the runway glideslope. The indications are fed to amplifiers 76. For a more detailed description of the glideslope computer, reference is made to the copending patent application Ser. No. 055,164, filed July 15, 1970, and entitled "Glideslope Position Detection System for Use With An Independent Aircraft Landing Monitor."

ANTENNA SYSTEM

Figure 5:
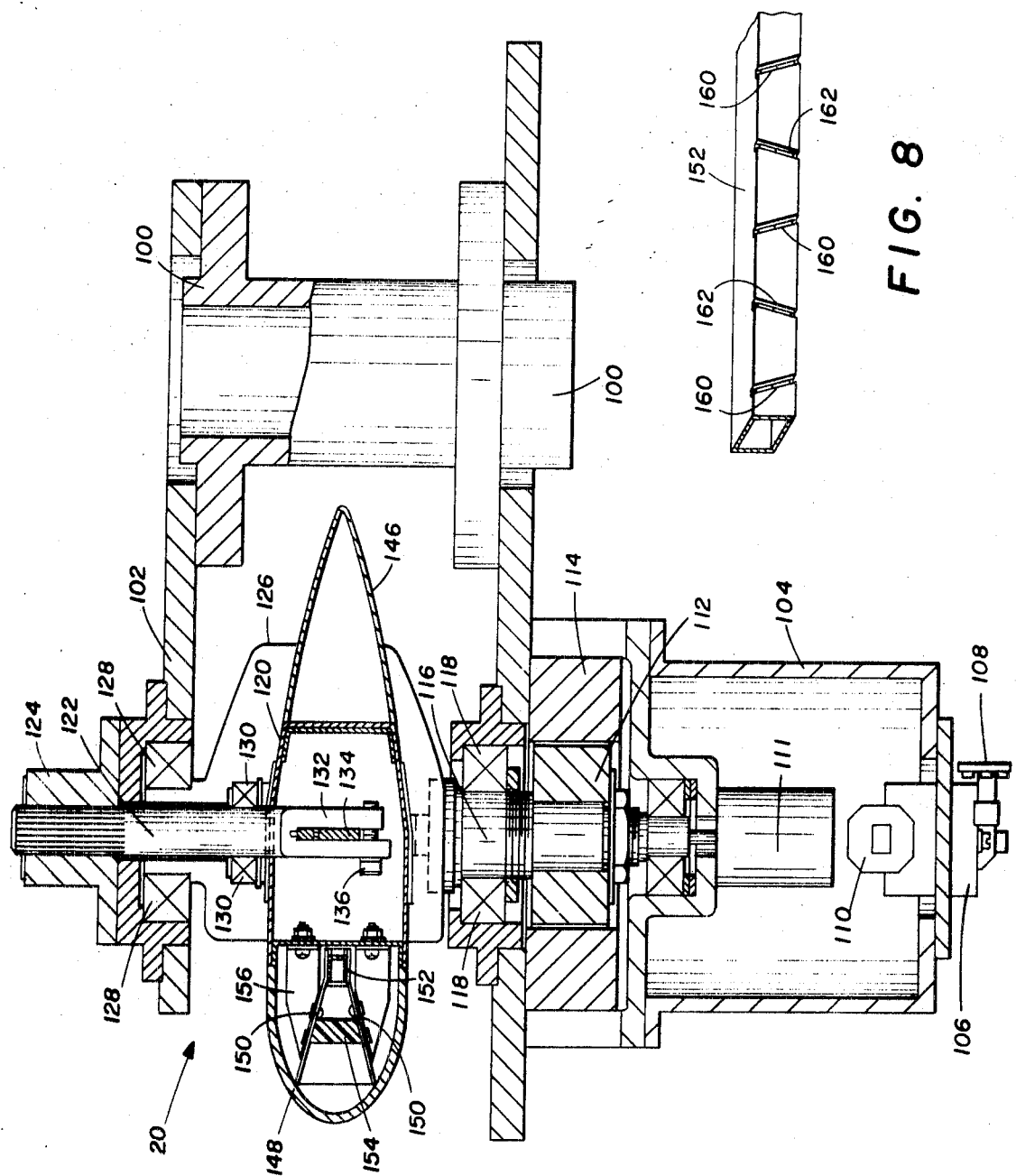
FIG. 5 is a central sectional view taken of the antenna of the present system.
Figure 6:
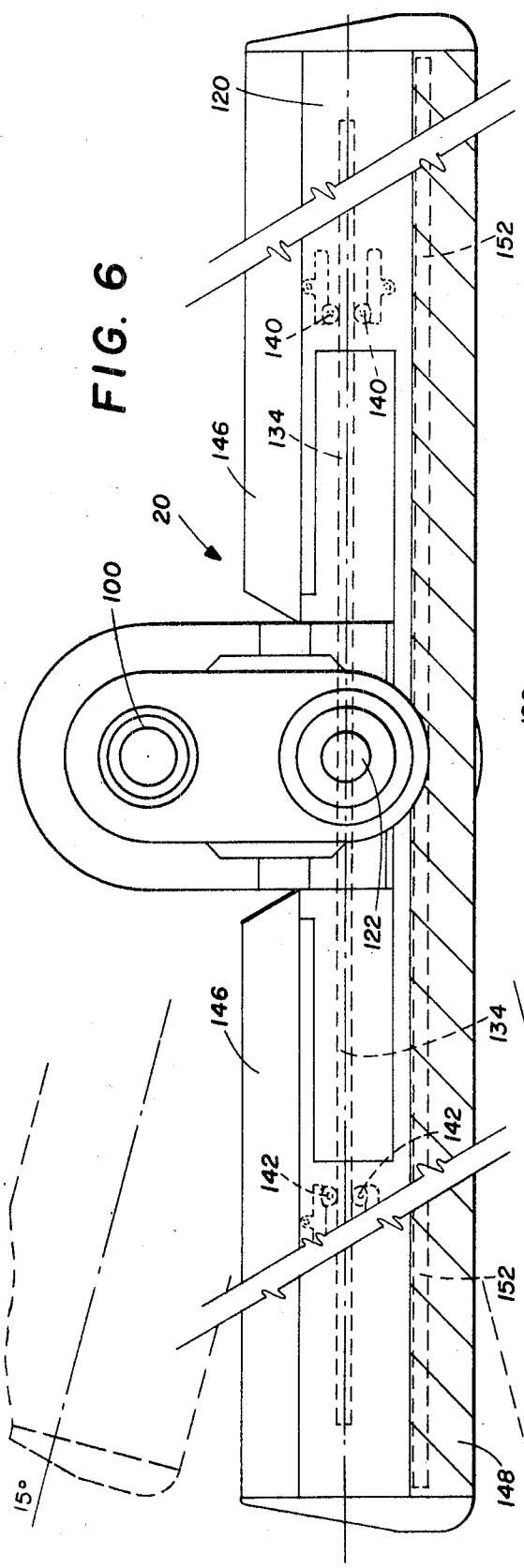
FIG. 6 is a top view, partially broken away, of the antenna shown in FIG. 5.
Figure 7:
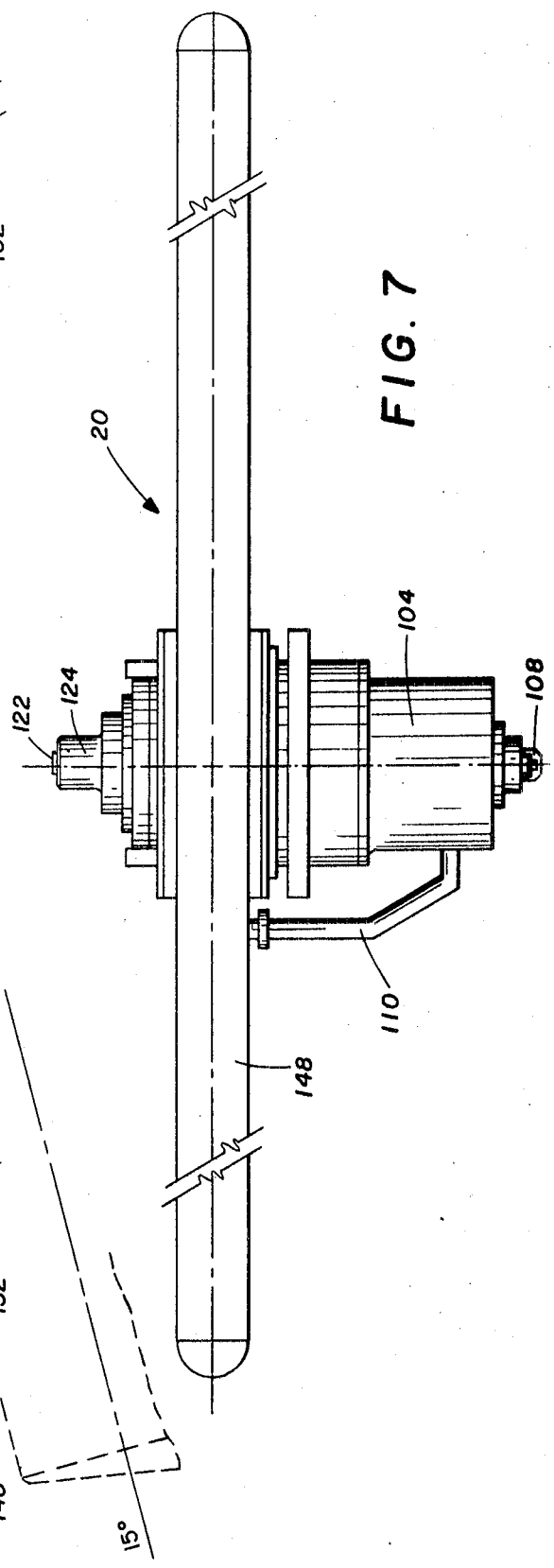
FIG. 7 is a front view, partially broken away, of the antenna shown in FIG. 5.

FIGS. 5–7 illustrate the antenna assembly 20. A generally cylindrical member 100 is adapted to be rigidly attached to a radome bulkhead within the nose of an aircraft. A housing 102 is connected to the cylindrical member 100 and supports the oscillating antenna assembly. A lower housing 104 contains a rotary joint 106 which enables rotation between a fixed waveguide section 108 and a waveguide section 110 which is attached to the oscillating antenna. The waveguide assembly 108 is connected to the transmitter and receiving circuitry of the system. The entire waveguide assembly of the system is normally pressurized with Freon-116. A control transformer 111 is connected to a torque motor including a torque rotor 112 and a torque motor stator and housing 114. The control transformer 111 senses the position of the antenna and supplies signals to the antenna control loop previously described in order to provide control signals to the torque motor to maintain the desired oscillation of the antenna.

The output shaft 116 of the torque motor is mounted in bearings 118 and is fixedly attached to an antenna housing 120 for oscillation thereof. A shaft 122 is fixed at the upper end of the housing 124 which is bolted onto housing 102. An outer housing 126 is connected to the oscillatable antenna and is mounted in bearings 128 and 130 for relative rotation with respect to the fixed housing of the antenna system. The lower end of the shaft 122 is connected to a generally U-shaped member 132 which receives a center portion of an elongated flexible metal spring 134. A bolt 136 enables the U-shaped member 132 to be tightly clamped about the center of the spring 134. As best shown in FIG. 6, the spring 134 extends along the length of the antenna housing 120. The ends of the spring 134 are free, but are slidably received between rollers 140 at one end, and rollers 142 at the other end thereof. As the antenna housing is oscillated, the spring 134 flexes and rotates relative to the rollers 140 and 142. The spring 134 stores energy upon rotation of the antenna housing and tends to return the housing back to its previous position.

A real housing portion 146 is attached to housing 120 to provide an aerodynamically streamlined configuration to the antenna. A forwardly facing radome 148 is also attached to housing 120. Preferably, radome 148 is constructed from a material such as fiberglas to enable transmission of radar signals therethrough.

An antenna reflector horn 150 is disposed along the front length of the antenna and includes a waveguide 152 along the length thereof. Waveguide 152 is connected to waveguide 110. A quarter-wave grid type polarizer 154 is mounted in the reflector 150 and is preferably comprised of a foam type dielectric material. A backing channel member 156 is connected to the reflector 150.

As shown in FIG. 6, in operation the antenna is swept about the vertical axis extending through shaft 122 about a 30° angle, or 15° on either side of the "head-on" position of the antenna. The spring 134 assists in maintaining oscillation of the antenna and the error signals fed from the control transformer control circuit back to the torque motor assists in maintaining the oscillation of the antenna at the predetermined angle.

In the preferred embodiment of the antenna, the antenna is approximately 60 inches long and 7 inches wide. The present antenna is preferably operated in the Ka band of 33 to 38 GHz. With a 2.5 dB antenna loss, the antenna gain for the preferred system is approximately 33.5 dB.

The present antenna is of an edge-slotted waveguide array type. More particularly, reference is made to FIG. 8 which illustrates a section of the edge-slotted waveguide 152 utilized in the present antenna. A plurality of slots 160 slope in a first direction, while alternate slots 162 cut through the front face of the waveguide slant in an opposite direction. The slots are regularly cut in the front narrow wall of the waveguide 152 and are designed to resonate at a frequency which is twice the waveguide wave length spacing. Thus, at resonance all of the slots radiate in phase and the beam is oriented normal to the array length. At resonance the slots 160 and 162 become a pure conductance and add, since the slots are in shunt in the transmission line circuit. At the resonant frequency, the load is thus pure resistive and is equal to the sum of the slot conductances.

To properly illuminate the array, power is extracted from the traveling wave as each slot is illuminated. Because of this, the slot conductance is increased with distance from the feed point of the waveguide, thus resulting in a total conductance much greater than unity and consequently resulting in a large resistive mismatch at resonance. For this reason, the present array is operated slightly above the resonant frequency. The beam is thus pointed approximately one to two beam widths away from broadside of the antenna. Under this condition, a VSWR of less than 1.2:1 is insured. The present antenna of the preferred embodiment will operate at 178 wavelengths at the Ka-band. For additional description of the theory of such edge-slotted waveguide arrays, reference is made to *Antenna Engineering Handbook*, by H. Jasik, 1961, Chapter 9, McGraw-Hill.

The quarter wave plate polarizer member 154 converts the horizontal polarization of the slotted array feed to circular polarization. The polarizer 154 is a quarter wave device comprising a plurality of regularly spaced narrow metallic vanes supported in the low-loss dielectric Eccofoam material. The orientation of the metal vanes are at an angle of 45° with respect to the antenna polarization to thereby convert the linear polarization to circular polarization. An integrated cancellation ratio (ICR) of 17 dB is readily achievable utilizing this circular polarization technique.

Although not shown, in the preferred embodiment of the antenna, the waveguide 152 is routed in a second path back along the length of the antenna to maintain symmetrical loading thereof. The waveguide and the reflector antenna horn are generally constructed from aluminum and connected in a rigid configuration. The torque motor chosen for use with the invention in the preferred embodiment is a brushless DC torque motor with a permanent magnet rotor and a toroid coil wound stator. The motor is rated ±25° angular motion, continuous at 8 watts and a 20 ounce-inch peak torque. A high pressure reserve bottle of Freon-116 is mounted near the far end of the waveguide and feeds the waveguide with pressurized Freon-116 through a preset pressure reducer. A pressure gauge fitting on the bottle allows checking of the reserve supply and a similar attachment combined with the lead valve is provided at the end of the waveguide adjacent to the load to allow verification of pressure in the waveguide and to enable bleeding of the system after maintenance.

Figure 9:
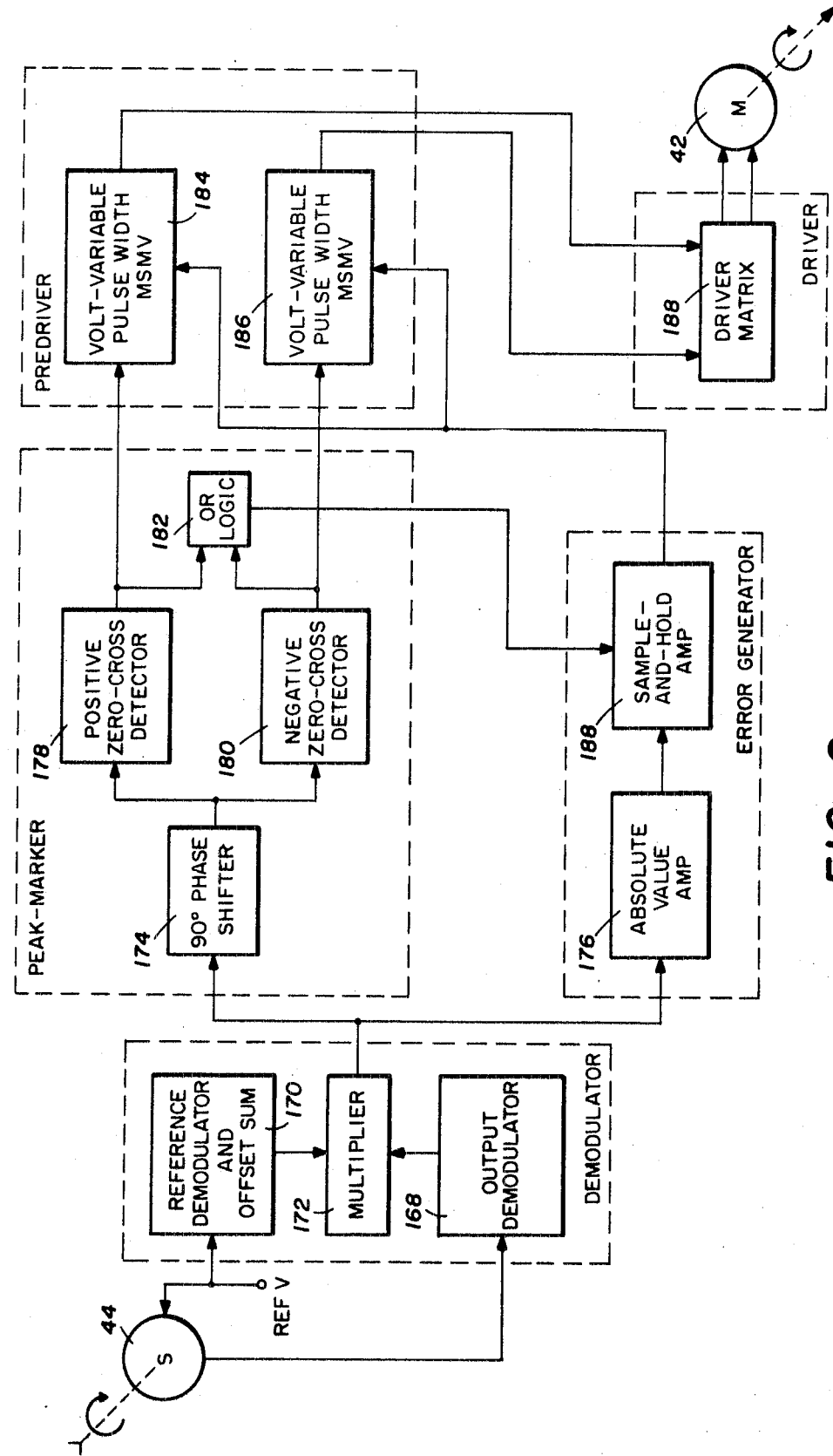
FIG. 9 is a block diagram of the antenna sweep control circuitry of the invention.

FIG. 9 illustrates in block detail the circuit for control of the oscillatory motion of the antenna 42. The synchro 44 comprises a linear transformer which generates a modulated 2,000 cycles per second signal to an output demodulator circuit 168. A reference voltage, which preferably is the 2,000 cycle per second aircraft supply voltage, is fed to the synchro 44 and to a reference demodulator and offset sum circuit 170. Circuit 170 compensates the aircraft supply voltage for changes in voltage amplitude and supplies a constant voltage amplitude to a multiplier 172. Circuit 170 thus prevents detection of changes in the aircraft supply voltage amplitude as changes in the antenna position.

The output of the output demodulator 168 is a slowly varying DC signal at the antenna scan rate, which in the preferred embodiment is 2½ cycles or above. The output of the demodulator 168 is thus responsive to the instantaneous position of the antenna 20. The output of the multiplier 172 generates a signal responsive to the antenna position to the 90° phase shifter 174 and to the absolute value amplifier 176. The 90° phase shifter 174 shifts the sinusoidal output from the multiplier 172, such that zero crossings thereof are representative of the occurrence of peaks of the waveforms. A positive zero crossing detector 178 generates an electrical indication of the positive amplitude peaks of the antenna position signal, while a negative zero crossing detector 180 provides indications of the negative voltage peaks of the amplitude position signal.

The output of detector 178 is fed to an input of an OR logic 182 and also to the trigger input of a voltage variable pulse width monostable multivibrator 184. The output of the detector 180 is also fed through the OR logic 182 and also to the trigger input of a voltage variable pulse width monostable multivibrator 186. The multivibrator 184 is triggered upon the occurrence of each positive peak of amplitude position signal, while the multivibrator 186 is triggered only upon the occurrence of negative peaks of the antenna position signal.

The output of the OR logic 182 is fed to a sample and hold amplifier 188. The absolute value amplifier 176 rectifies the position signal from the multiplier 172 and gives a positive voltage output indicative of both the left and right scan peak positions of the antenna. This information is fed to the sample and hold amplifier 188, which generates a positive voltage representative of the peak left and right position of the antenna only upon the occurrence of a position peak as detected by the OR logic 182. This voltage is applied to the multivibrators 184 and 186. As the multivibrators 184 and 186 are alternatively triggered by detectors 178 and 180, a monostable multivibrator output pulse is alternatively generated by the multivibrators which is representative of alternating left and right antenna position peaks.

The pulse width of the multivibrator outputs is dependent upon the detected position of the antenna. The pulse outputs from the multivibrators are fed to a driver matrix 188, which may comprise a transistor driver or an SCR circuit driver. The pulse outputs are then applied to the torque motor 42 in order to control the position of the antenna. One of the pulse outputs drives the motor 42 in a clockwise direction while the other pulse outputs drive the motor 42 in a counterclockwise direction. If the antenna oscillation begins to slow down, the pulse width of the outputs from the multivibrators is increased to increase the drive to the antenna. Conversely, if the peak left and right positions of the antenna begins to exceed predetermined position limits, the width of the pulse outputs from the multivibrators 184 and 186 decreases in order to decrease the driving motion to the motor 41.

RADAR RECEIVER

Figure 10:
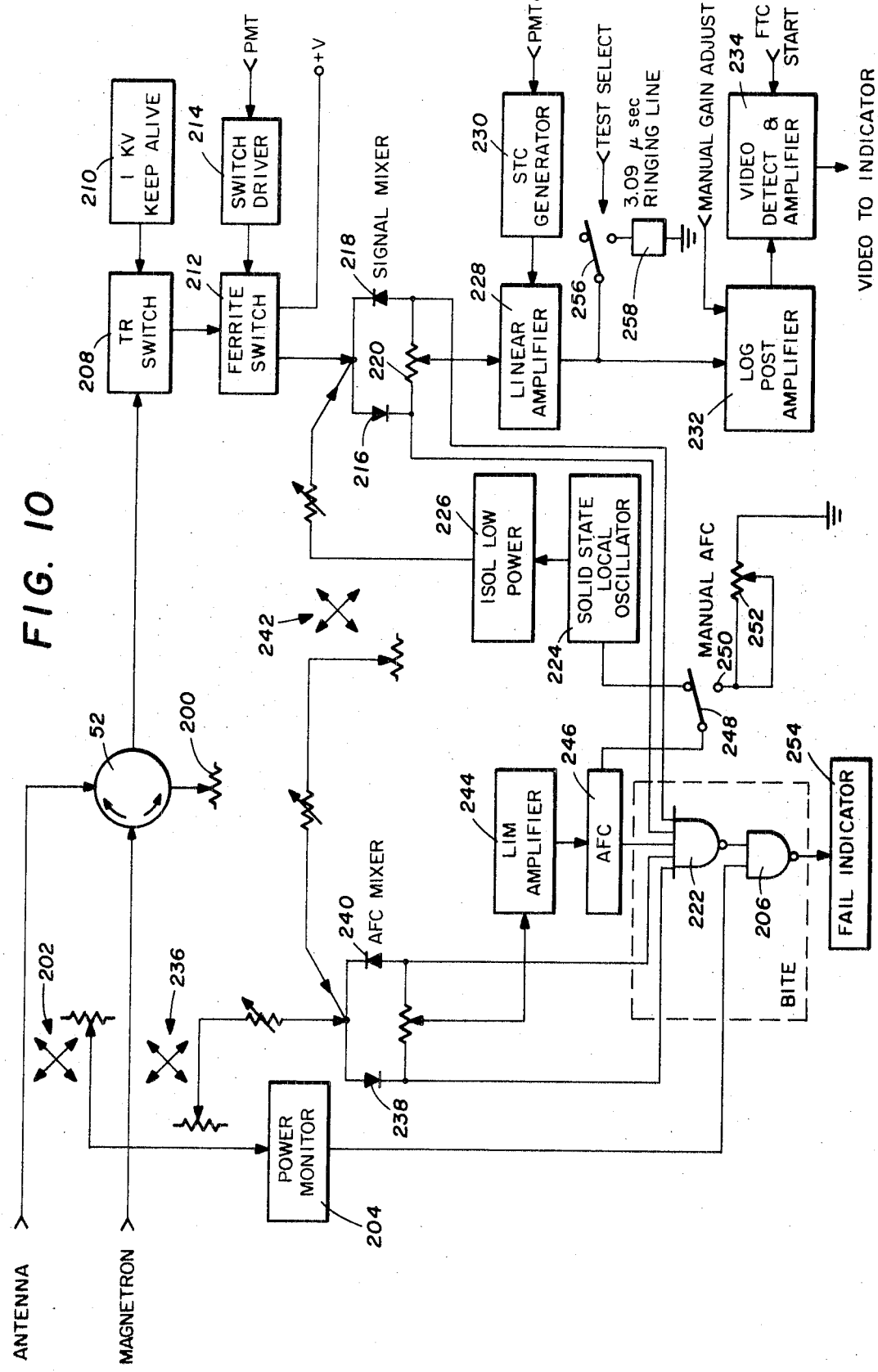
FIG. 10 is a block diagram of the radar receiver utilized in the present system.

FIG. 10 illustrates a block diagram of the radar receiver of the invention. Radar signals received by the antenna are fed through the ferrite circulator 52, previously described. A load 200 is attached to the circulator 52 for use in testing of the receiver. The transmitter magnetron is also connected to the circulator 52. The circulator 52 is operated as a duplexer to permit the use of a single antenna. The signals from the transmitter are sampled through a coupler 202 and are fed through a power monitor circuit 204 to one input of a NAND gate 206 and the built-in test equipment unit of the system.

The received signals from the antenna are transmitted through the circulator 52 which may comprise the circulator R–641–LS manufactured and sold by Ferrotech, Inc. to a T-R switch 208. Switch 208 may comprise, for instance, the switch tube MA–3773 manufactured and sold by Microwave Associates. A keep-alive circuit 210 biases the T-R switch 208 so that the switch tube is on the verge of breaking down in order to provide signal isolation in the known manner. The received signals are further fed through a ferrite switch 212 which provides additional attenuation from the transmit pulse. The ferrite switch may comprise, for instance, the LTW103 switch manufactured and sold by Ferrotech, Inc. The PMT signal is fed through a switch driver 214 in order to control the operation of the ferrite switch 212.

The receiver signals are fed through a signal mixer comprising diodes 216 and 218 connected at opposite polarity terminals. A resistance 220 is connected across the diodes and is also connected to two inputs of a NAND gate 222. A solid state local oscillator 224 comprises a voltage controlled oscillator which supplies a 50 MW signal at 1.458 GHz to a power amplifier which increases the power to about one watt. The signal is then fed through a x6 multiplier which preferably will comprise a thin-film device. The resulting 250 MW signal at 8.75 GHz is fed through a x4 multiplier to generate the final 10 MW signal at 32.94 GHz ±150 MHz. This resulting signal is fed through an isolation circuit 226 for mixing with the received signals. The frequency applied to a linear amplifier 228 comprises a 60 MHz intermediate frequency.

The IF signal is amplified in the linear amplifier 228 and a sensitivity time control (STC) signal is applied to reduce the receiver saturation as the target range decreases. The STC signal is applied from a generator 230 which is controlled by the PMT signal of the system. The amplified signals are applied through a log post amplifier 232 wherein a final 80 dB gain is applied to the signal. A manual gain adjust control is applied to the amplifier 232. Amplifier 232 has a linearlogarithmic characteristic matched to the indicator dynamic range of the system to insure the optimum display of radar target information. In the preferred embodiment, the amplifier 232 comprises seven amplification stages all of which operate for low power signals. The stages begin to saturate one by one as the received signal becomes stronger, in order to give a voltage output which is a linear function of the input power to the system.

The output of amplifier 232 is applied to a video detector and amplifier 234 which includes an emitter follower output. The detector 234 regulates the 60 MHz signal and operates as an envelope detector to generate a video voltage pulse. A fast time constant (FTC) operation may be applied at the amplifier 232 at the operator's option. The FTC operation serves to break up targets with large cross section, such as terminal buildings or residential areas, to prevent the saturation of the radar display. The video voltage pulses are applied to the indicator of the system in a manner to be later described in greater detail.

A power monitor coupler 236 detects the signals transmitted from the magnetron and applies the signals to an AFC mixer comprising diodes 238 and 240 connected at opposite polarity terminals. The output from the isolator circuit 226 is also monitored by a coupler 242 and applied to the AFC mixer. The mixed signal, when the system is correctly operating, should be at the IF frequency and is applied through a limiting amplifier 244 to the AFC circuit 246. The output of the AFC circuit 246 is applied to an input of the gate 222. The AFC mixer is also connected to two inputs of the gate 222. The AFC circuit 246 is connected through a movable switch arm 248 which is movable between connection to the local oscillator 224 and connection to a terminal 250. Terminal 250 is connected to a test load resistor 252 which is connected to circuit ground.

The above-described AFC circuit maintains the receiver in frequency synchronization with the transmitter. When the receiver is properly operating, the resultant signal from the AFC mixer should be at the IF frequency. The mixed signal is applied to the AFC circuit 246 which contains discriminator and reference oscillator circuitry to generate a DC signal for control of the local oscillator 224. If it is impossible to drive oscillator 224 to the desired frequency value, the resulting signal is applied to the gate 222 and gate 206 in order to actuate a fail indicator light 254 located on the aircraft instrument panel. Additionally, the presence of minimum transmitter peak output power is sensed by the power monitor circuit 204, and the fail indicator light 254 is energized if the output power falls below a predetermined minimum value.

The presence of mixer crystal bias current is also determined by the gate 222 and the fail indicator light 254 is illuminated if a current failure occurs. The illumination of the fail indicator light 254 indicates a condition below design minimums, but does not necessarily indicate a complete failure of the radar. Operator adjustment will be required to judge when the information displayed by the system has deteriorated to a point of being completely unusable. To enable the operator to make such a decision, the movable switch arm 248 may be moved to the manual AFC test position and a movable switch arm 256 moved to connect the output of the linear amplifier 228 with a ringing line 258.

The ringing line 258 generates a series of IF pulses spaced a predetermined delay apart the pulses being fed through the amplifier 232 for display upon the visual indication system of the invention. Six horizontal lines are displayed upon the radarscope, along with one vertical line at a position equivalent to the aircraft line of flight. This is accomplished by simulating an altitude input of 500 feet into the display. The ringing line 258 is actuated by an attenuated transmitter pulse which excites the ringing line to create a pulse train of 60 MHz pulses which are 2000 feet apart in radar range and which decrease in amplitude with increasing range. The pulse trains produced by the ringing line 258 are displayed on the visual display as horizontal lines to give an indication of correct operation of the antenna scan drive circuitry, the synchros and the display circuitry.

The amplitude of the injected pulses into the amplifier 232 is such that the six horizontal lines will be produced on the radarscope equivalent to two, four, eight, ten and twelve thousand feet ranges as viewed from 500 feet. The seventh and subsequent pulses from the ringing line 258 will fall below the system threshold and will thus not be displayed. The line display provided by the ringing line gives a good indication of proper receiver gain control setting, and if less than six lines are displayed when the system is put in the test position, the receiver sensitivity is below operating minimums. The vertical strobe which appears on the face of the visual display in the test mode is positioned by the antenna position synchro. The position of the vertical strobe horizontally relative to the center line is a measure of the linearity and accuracy of the display sweeps in the bore site position.

For additional description of radar receiver operation, reference is made to *Introduction To Radar Systems*, Chapter 8, by Merrill I. Skolnik, 1962, McGraw-Hill.

RADAR TRANSMITTER

Figure 11:
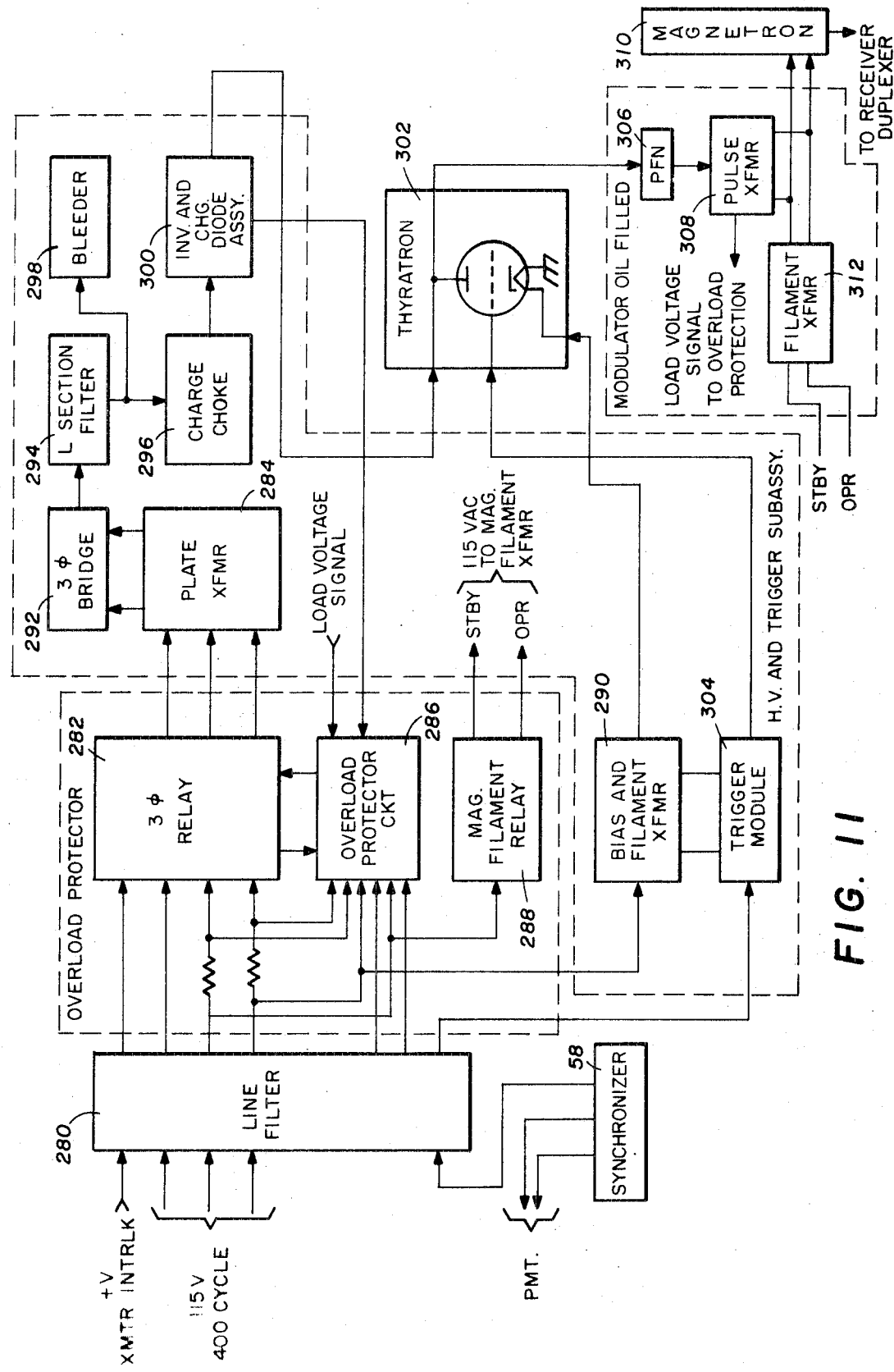
FIG. 11 is a block diagram of the radar transmitter utilized in the present system.

FIG. 11 illustrates a block diagram of the present radar transmitter. Input power is supplied to the present system via the 400 cps conventional aircraft supply and passed through a line filtering system which filters out the high frequency components of the aircraft voltage supply system. Three-phase relay switch 282 switches the 400 cycle cps signal into a plate transformer 284. Overload protector circuit 286 prevents overload of the system and a magnetron filament relay circuit 288 supplies current to the magnetron filament. Current is supplied to the filament of the thyratron of the circuit via a transformer 290.

A three-phase bridge 292 supplies rectified voltage via the L-section filter 294 to a charging choke 296. A bleeder circuit 298 provides discharge protection to the filter 294 when the system is turned off. The charging choke 296 includes inductors which provide a high impedance load for the system. The voltage is applied via an inverse and charging diode assembly 300 to the transmitter thyratron 302. A trigger module 304 supplies trigger pulses to the grid of the thyratron 302. The output of the thyratron 302 is applied through a pulse forming network 306 which pulses when the thyratron 302 fires. The pulses from the network 306 are applied through a pulse transformer 308 which supplies pulses to the magnetron 310. The modulator of the invention is oil filled in order to eliminate voltage breakdown at high altitudes and to comply with decompression tests required to meet FAA environmental specifications. While a number of Ka band magnetrons are commercially available, the preferred embodiment of this system utilizes a L-4564 tunable tube manufactured and sold by Litton Industries which is modified to deliver 80 KW peak power. Power for the magnetron 310 is applied through a filament transformer 312. The output of the magnetron 310 is applied to the circulator 52.

The synchronizer 58 supplies the PMT signal for timing operations of the system in the manner previously described.

In operation of the radar transmitter, the synchronizer 58 supplies a PMT signal to the trigger module 304 which delays the PMT to provide the thyratron trigger signal. The thyratron 302 normally has a high impedance and the pulse forming network 306, which preferably comprises a chain of L-C networks, is charged up to the plate voltage applied to the thyratron 302. When the thyratron is fired, the pulse forming network 306 discharges through the pulse transformer 308 which steps up the voltage to provide a high voltage drive to the magnetron 310. A 40 ns pulse width signal is generated by the pulse forming network 306 for application to the magnetron 310. The inverse diode assembly 300 supplies a current return path for the energy which is not transferred to the magnetron due to mismatch between the pulse forming network and the pulse transformer during discharge. The modulator is protected by the overload protector circuit 286 for overloads caused by excessive line currents, magnetron arcing or magnetron open circuits. In the occurrence of an overload, the three-phase power to the modulator high voltage supply is removed.

For additional description of radar transmitter operation, reference is made to *Introduction To Radar Systems*, Chapter 6, by Merrill I. Skolnik, 1962, McGraw-Hill.

SWEEP GENERATOR SYSTEM

Figure 12:
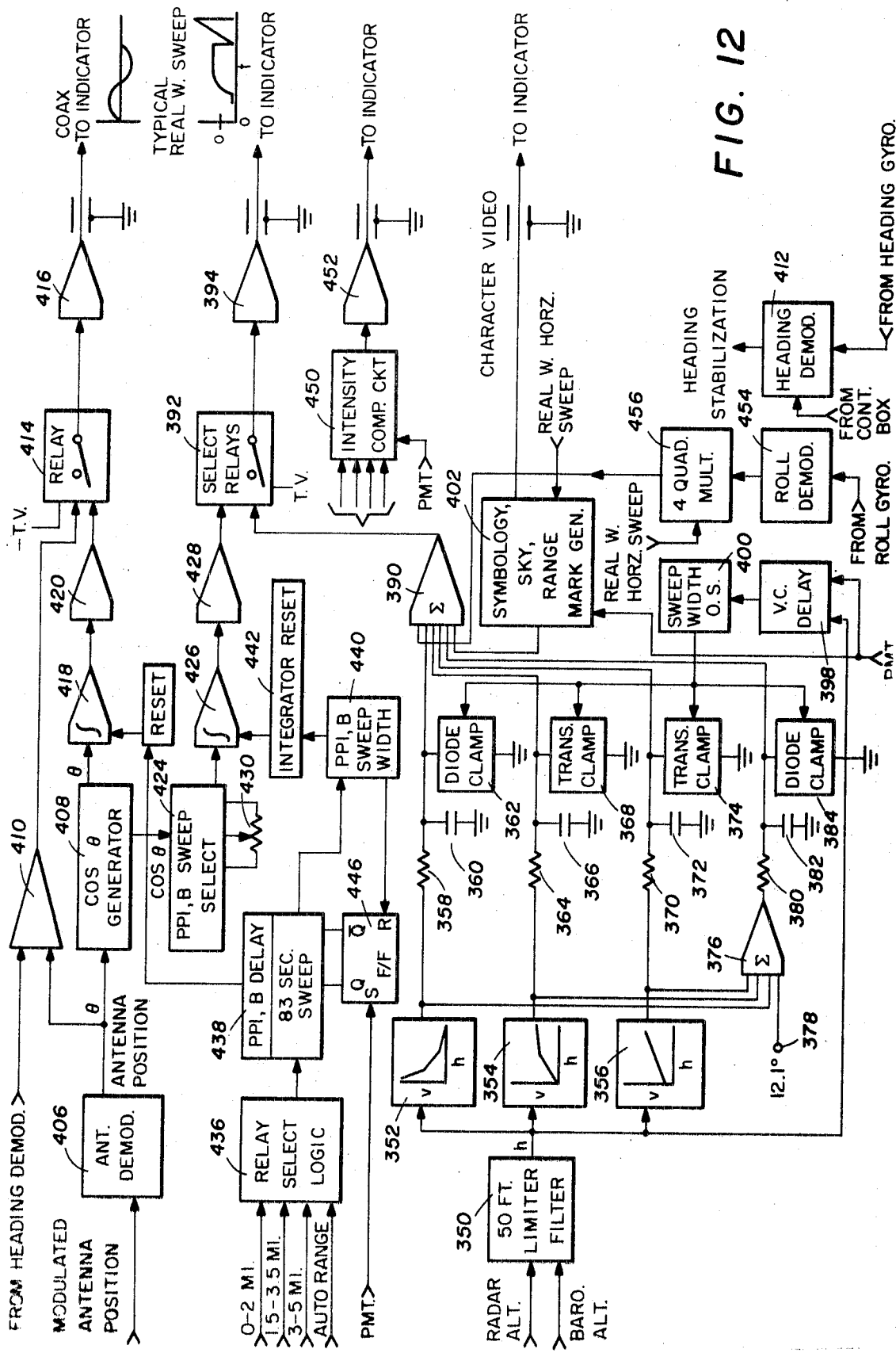
FIG. 12 is a block diagram of the sweep generation circuitry utilized to control the radar display of the present invention.

Referring to FIG. 12, a block diagram of the sweep generator circuitry is illustrated. Radar altitude and barometric altitude indications from altitude sensing equipment aboard the aircraft are fed to the limiter filter 350 such that the present system does not operate upon any altitudes less than 50 feet. Filter 350 also tends to smooth the altitude signals to eliminate sensing of towers, trees and the like. The filtered signals are then fed into three waveform shaping networks 352, 354 and 356. Shaping network 352 will be later illustrated in greater detail and shapes the input waveform to generate an output signal which varies in voltage magnitude with respect to altitude in the manner illustrated.

The shaped voltage is applied to an R-C circuit comprising resistor 358 and capacitor 360. A diode clamp circuit 362 controls the charging operation of the R-C circuit. The shaped voltage output from the network 354 is applied to an R-C network comprising resistor 364 and capacitor 366, the storage operation thereof being controlled by a transistor clamp circuit 368. Similarly, the shaped voltage output from network 356 is applied to an R-C network comprising resistor 370 and capacitor 372. A transistor clamp 374 is connected across capacitor 372.

Each of the voltage outputs from networks 352, 354 and 356 are fed into an input of a summing and subtracting circuit 376. The sum of the three shaped voltages are therein subtracted from a reference input voltage supplied via terminal 378 which is representative of a maximum elevation angle reference to the horizontal of 12.1°. The output of the circuit 376 is thus representative of the voltage required to bring the total of networks 352-356 up to a maximum elevation angle of 12.1°. The output signal of circuit 376 is fed to an R-C network comprising resistor 380 and capacitor 382. A diode clamp circuit 384 is connected across capacitor 382 for control thereof.

An important aspect of the invention is the fact that the time constants of the various R-C circuits of the sweep generator are varied. Thus, the value of capacitor 372 is 125 times the value of capacitor 360, while capacitor 366 is 25 times the value of capacitor 360. The value of capacitor 382 is 5 times the value of capacitor 360.

The exponential voltage waveforms generated on capacitors 360, 366, 372 and 382 (when the clamps are disabled) are each supplied to an input of a summing amplifier 390, the output of which is applied through a select relay control 392 to a driver amplifier 394. The sum of the exponential voltages generated when the R-C networks are unclamped, and allowed to charge to the voltage presented by its respective shaping circuit, will approximately vary in accordance with a ratio of aircraft altitude and time, or radar range. The output of the driver amplifier 394 is utilized to control the vertical line driver of the display radarscope. In the manner to be more fully described, this drive is a nonlinear signal to provide a real-world perspective display of the approaching runway. The limited and filtered altitude signal is also applied to a voltage controlled delay circuit 398. The output of delay 398 controls the time at which a sweep width one shot multivibrator 400 is triggered, the output of which is applied to control each of the clamp circuits 362, 368, 374 and 384.

The PMT signal is also applied to the delay 398 and also to the symbology, sky and range mark generator 402. The horizontal sweep signal is applied to the generator 402 for control thereof. After the delay determined by 398, the sweep width one shot 400 operates to unclamp the clamp circuits 362, 368, 374 and 384 such that the R-C storage networks begin to charge according to their various time constants to the voltage levels presented by their appropriate shaping network. The sum of the voltage waveforms generated by the R-C networks are representative of the ratio of the aircraft altitude and radar range. The delay induced by delay circuit 398 is linearly proportional to aircraft altitude. At the end of the sweep width one shot period, the clamp circuits clamp the capacitors to ground potential.

Upon unclamping of the various clamp circuits, the voltages generated on the R-C networks are applied to the summing amplifier 390 for operation of the vertical line driver of the visual display. The modulated antenna position signal supplied from the antenna sensing synchro is fed to an antenna demodulator circuit 406 which supplies a signal indicative of the antenna position to a cosine generator 408 and also to an amplifier 410. A signal from a heading demodulator circuit 412 is also applied as an input to amplifier 410. The heading demodulator receives inputs from the control box, previously described, and from the heading gyro of the aircraft to generate a signal representative of the heading stabilization.

The output of amplifier 410 is applied through a select relay 414. If the B-sweep or real-world sweep is selected at the relay 414, the output from the amplifier 410 is fed to a line driver circuit 416 which is fed through a coaxial cable to the radarscope for driving the horizontal sweep for the B or for the real-world perspective modes. If the PPI sweep mode is selected at the relay 414, an output from the cosine θ generator 408 representing θ (or antenna position) is applied through an integrating amplifier 418 and through an amplifier 420 for control of the horizontal line driver circuit 416.

The output from the heading demodulator 412 is fed to the amplifier 410 for modification of the horizontal scan voltage. The visual display is then compensated so that the runway remains in essentially the same spot during small variations of the aircraft heading to prevent the runway from moving during a rough approach.

Another output of the generator 408 representing cos θ is applied through a PPI or B sweep select circuit 424, the output of which is fed through an integrating amplifier 426 and an amplifier 428 to the select relays 392. The amplitude of the vertical B sweep may be adjusted by a variation of the rheostat 430 at the B sweep select circuit 424. The output of the amplifier 428 is applied through the select relay 392, if the B sweep or PPI mode is selected, to operate the vertical line driver circuit 394 for control of the vertical sweep of the radarscope.

A relay select logic network 436 may be operated according to any of four range signals to operate a PPI and B sweep delay circuit 438. In the automatic range mode of operation, an 83 second sweep circuit is utilized in delay circuit 438. This sweep varies the PPI or B delay time at a rate corresponding to the rate at which the aircraft would normally approach the runway during landing. Circuit 438 operates a PPI or B sweep width circuit 440 which applies the signal to the integrator reset circuit 442 for resetting of the integrating amplifier 426. The PMT signal is applied to the S input of a flip-flop circuit 446 and the sweep width circuit 440 is connected to the R terminal of the flip-flop circuit 446.

A plurality of inputs are applied to an intensity compensation circuit 450 which controls a line driver 452 for control of the unblanking operation of the visual indicator. The PMT signal is applied to the intensity compensation circuit 450, as are inputs from the sweep width circuits to determine the unblanking time and the derivative of the real-world vertical sweep. The derivative of the real-world vertical sweep is added to a pulse during the time that it is desired that the visual indicator be unblanked. The amplitude of the derivative of the real-world vertical sweep varies with altitude and time, such that the low altitude signals are provided with greater intensity at the start of the sweep than are those for high altitude.

A roll demodulator circuit 454 senses the movement of the aircraft about the roll axis from the aircraft gyro. The output of the demodulator 454 is fed to a four quadrant multiplier 456 which generates an input for the summing amplifier 390. The real-world horizontal sweep is also fed to the multiplier 456 for multiplication thereof by the roll angle and for addition to the vertical scan signal. Thus, the circuitry senses the rotation of the aircraft and correspondingly rotates the picture of the runway displayed upon the radarscope to assist in the real-world display.

In operation of the system in the B sweep mode, the select relays 392 and 414 are moved to the B sweep mode position with the use of the mode select switch on the aircraft display instrument panel. The modulated antenna position is thus fed through the antenna demodulator circuit 406 and through amplifier 410 for operation of the horizontal line driver 416. The horizontal sweep of the visual indicator is thus proportional to the antenna sweep. The vertical sweep width of the B sweep mode is set at circuit 440 and the integrating amplifier 426 and the amplifier 428 operate the vertical line driver 394 to provide a linear ramp increasing as a function of time to operate the vertical sweep of the visual indicator. The sweep ends at whatever sweep width is set into the circuit 440. The resulting sweep thus provides a conventional B sweep display on the radarscope.

If a delayed B sweep mode of operation is chosen at the select relays, the display of a segment of a detected area is provided on the radarscope display. The circuit operates as previously described, with the exception that the delay circuit 438 operates to prevent operation of the vertical B sweep for the selected time interval chosen at the relay select logic 436.

The automatic range selection may be made at the relay select logic 436 to thereby switch in the 83 second sweep and the delay circuit 438. This mode of operation varies the delay time at which the vertical sweep is initiated and thus compensates for the speed of the aircraft, so that the detected airport runway maintains at essentially the same spot on the radarscope, thus easing the problems of identifying and recognizing the position of the runway to the radarscope. The runway becomes larger as the aircraft approaches, but remains in view on the radarscope to eliminate switching of ranges into the scope display.

In the PPI operation mode, the select relays 392 are switched to the PPI position. The vertical line driver 394 is thus driven by a positive ramp signal from 408 whose amplitude is proportional to the cosine of the antenna signal fed into the antenna demodulator circuit 406. The horizontal line driver 416 is driven through the cosine $\theta$ generator 408, the integrator amplifier 418 and amplifier 420 according to an approximation of range multiplied by the sine of the azimuth angle, which for the present system may be approximated as range multiplied by the azimuth angle. As previously noted, both the B sweep, delayed B sweep and PPI displays are conventional and will not be discussed in further detail.

In the operation of the real-world display of the invention, the select switches are suitably positioned and radar or barometric altitude signals are fed into the 50 feet limiter filter 350. The filtered and limited signal is fed simultaneously into the waveshaping networks 352, 354, and 356, wherein the voltages are shaped according to altitude in the illustrated manner. The shaped voltages are applied respectively on capacitors 360, 366 and 372 and clamp circuits through resistors 358, 364, 370. Additionally, a voltage representative of the difference between a 12.1° elevation angle and the sum of the outputs from the waveshaping networks is applied to the R-C network defined by resistor 380, capacitor 382 and the diode clamp. Upon unclamping of the various clamp circuits, the R-C networks begin charging up according to their respective time constants. The summing amplifier 390 thus generates a vertical drive which is a nonlinear function which is approximated by:

$$\beta = h/r \quad 1$$

wherein $\beta$ = the elevation angle,
$h$ = the aircraft altitude, and
$r$ = the instantaneous target range of the radar signals.

Driving the vertical sweep of the radarscope according to the nonlinear equation (1) operates to provide an airport runway display on the radarscope which directly corresponds to the real-world perspective view of the runway from the aircraft. In other words, the approaching runway will be displayed with a straight forward runway edge having straight runway sides converging toward the rear runway edge according to real-world linear perspective. Such a display not only assists the pilot in accurately determining the lateral offset of the aircraft from the runway and the area of touchdown on the runway, but the display assists the pilot in making a smooth transition from the instrument runway display to the actual view of the runway through the cockpit window during landing. As previously noted, prior displays such as the PPI and B sweep displays have distorted the real-world appearance of an approaching runway.

FIGS. 13–16 assist in the understanding of the operation of the real-world display of the invention. A study of factors influencing perspective vision has revealed that the human eye operates essentially in a spherical coordinate system wherein one of the cues for monocular depth perception is provided by a sensitivity to subtended angles. As a result, the human eye is conscious of parallel lines that tend to converge at infinity, since the angle subtended by the parallel lines approaches zero. Thus, the present radar display must transform straight lines in space into straight lines on the radar display, as well as providing linear perspective wherein parallel lines appear to converge at infinity.

Figure 13:
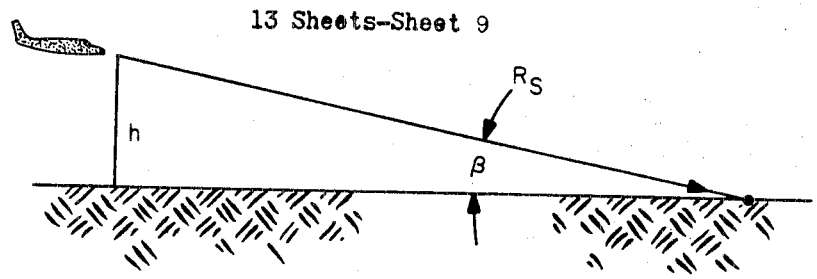
FIGS. 13 and 14 are diagrammatic illustrations of the relationships between the range and altitude of the aircraft in the display of the runway during glideslope approach.

In accordance with the present real-world display, the azimuth pointing angle of the system is determined and the elevation angle $\beta$ is synthetically generated. For this synthetic generation of $\beta$, it is assumed that the terrain beneath the aircraft is a level plane. Referring to FIG. 13, the angle $\beta$ may be seen to be:

$$\beta = \sin^{-1} h/R_s(\alpha,t) \qquad 2$$

wherein, $R_s$ = slant range to some point on the terrain,
$h$ = aircraft altitude, and
$\alpha$ = azimuth pointing angle.

If the altitude is known, $\beta$ may be generated for targets along the aircraft heading ($\alpha$=0) by noting that for a planar earth, $$R_s(0,t) = Kt \qquad 3$$

wherein, $K$ = constant for units of range per unit of time, and
$t$ = time.

Figure 14:
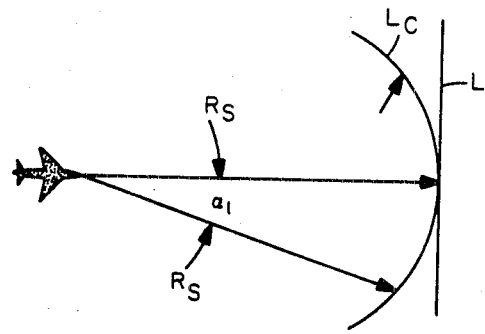
Figure 15:
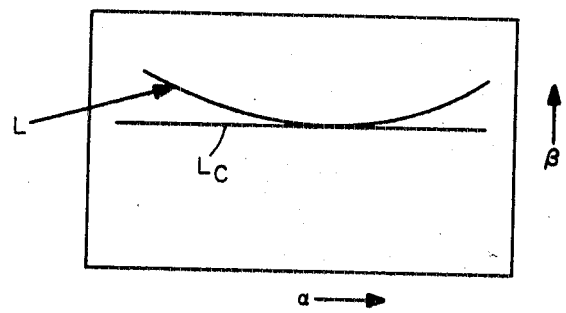
FIGS. 15 and 16 are diagrams illustrating aspects of the theory of operation of the present radarscope display.

Referring to FIG. 14, a long straight target lying perpendicular to the aircraft heading is identified as L. It is desirable that target L appear as a horizontal line on the present real-world display. However, unless a correction is applied to the sweep waveforms normally applied to the radarscope, some curvature will occur in the display of target L. For instance, assume that the constant $K$ has been chosen to provide the proper presentation for targets along the ground track for some fixed altitude. Targets along the curved line $L_c$ for some azimuth angle $\alpha$ off the aircraft heading line will appear as a straight line along a conventional radar display, as shown in FIG. 15. This is the natural result of the fact that equation (2) for $\beta$ contains no term which is a function of $\alpha$, and due to the fact that $R_s$ and h do not vary with $\alpha$. Thus, the constant $\beta$ locus describes an arc on the hypothetical planar earth which corresponds to a constant slant range $R_s$.

It is thus assumed that a vertical sweep waveform $\beta_d$ is generated according to the previous equation 2 as follows:

$$\beta_d = K_s \sin^{-1} h/Kt \qquad 4$$

wherein, $K_s$ = display scale factor in volts per inch per degree.

Points along the heading of the aircraft will thus be correctly displayed if the terrain is flat; however, points on the target L off of the heading line ($\alpha$= 0) will not be presented as a straight line on the display.

Figure 16:
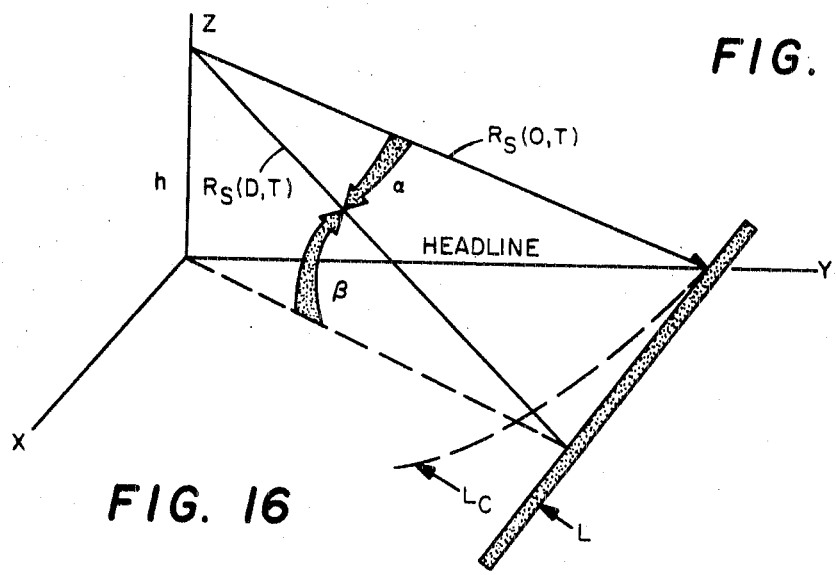

Referring to FIG. 16, the slant range to points on the target L may be simply derived in terms of $R_s(0,t)$ by the following:

$$R_s(\alpha,t) = R_s(0,t)/\cos \alpha = Kt/\cos \alpha \qquad 5$$

If L intersects the heading line at $t_0$, $$R_s(0,t_0) = Kt_0, \text{ and}$$
$$R_s(\alpha,t_0) = Kt_0/\cos \alpha$$

The elevation angle along the heading line at the intersection of target L is:

$$\beta_0 = \sin^{-1} h/Kt_0 \qquad 6$$

For other points on target L, the angle $\beta$ is a function of $\alpha$, or:

$$\beta(\alpha) = \sin^{-1} h \cos \alpha/Kt_0 \qquad 7$$

Equation (7) indicates the display appearance illustrated by FIG. 15.

In order to linearize the line L on the display, the display sweep waveforms should ideally be modified with some function of $\alpha$. Assuming the vertical waveform is the function:

$$\beta_d = K_s \sin^{-1} h/Kt \cos \alpha \qquad 8$$

for points along L where $t$ varies as, $$t = t_0/\cos \alpha, \qquad 9$$

$$\beta_d = K_s \sin^{-1} h/Kt_0 = \beta_0 \qquad 10$$

Thus, L now would appear as a horizontal line ($\beta_0$) across the display.

To minimize the cost and complexity of the display, it will generally be desirable to utilize an approximation of the vertical ($\beta$) sweep equation (8) PREVIOUSLY DEVELOPED.

Two obvious possible approximations can be considered:

$$\sin^{-1} x \cong x \text{ (for small } x\text{), and}$$
$$\cos y \cong 1 \text{ (for small } y\text{).}$$

Thus, the vertical sweep waveform can be approximated by the function:

$$\beta_d' = K_s h/Kt, \text{ or} \qquad 11$$

$$\beta_d' = K_s h/Kr, \qquad 12$$

wherein, $r$ = radar target range.

Figure 17:
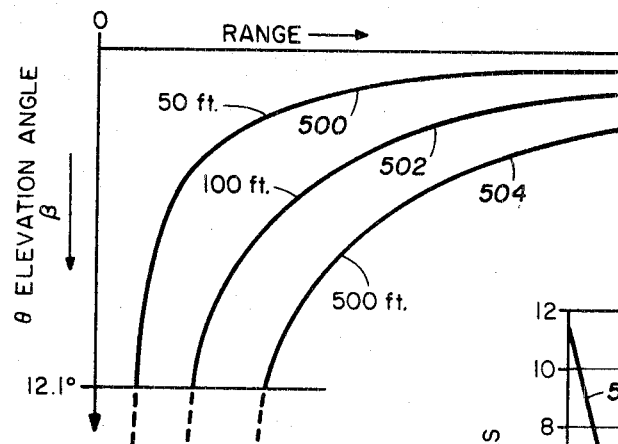
FIG. 17 is a graph illustrating the relationship between elevation angle, range and altitude according to the present display system.

FIG. 17 illustrates a graphical illustration of $\beta$ versus range for various aircraft altitudes, according to equation (12). A maximum elevation angle $\beta$ of 12.1° is utilized in the present system. The nonlinear aspects of the equation (12) may clearly be seen in FIG. 17. For an altitude of 50 feet as illustrated by curve 500, the elevation angle $\beta$ decreases rapidly at short ranges. As evidenced by curve 502, the elevation angle $\beta$ according to equation (12) at 100 feet altitude does not begin to decrease until a higher range than does curve 500. Similarly, the curve 504 representing an altitude of 500 feet does not begin to decrease in elevation angle $\beta$ for a higher range than the previous curves 500 and 502.

Referring to the line intersecting curves 500, 502 and 504 at the $\beta$ = 12.1° value, the range delay between the various curves is a linear function with respect to altitude. This linear delay is simulated in the present system by the voltage controlled delay circuit 398 which controls the sweep width of the one-shot multivibrator 400 for operation of the various clamps of the invention. The cut-off range of the various curves shown in FIG. 7 with respect to range is determined by the output pulse from the one-shot multivibrator 400.

Figure 18:
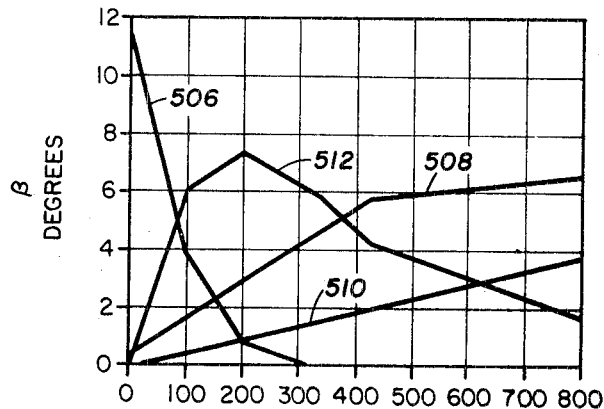
FIG. 18 is a graphical representation of the nonlinear voltages utilized to control the vertical sweep of the present radarscope display.

FIG. 18 illustrates in greater detail the various waveforms which are simulated by the waveform shaping networks 352, 354 and 356 shown in FIG. 12. Waveform 506 is a function approximated by the waveshaping network 352, and it may be seen that $\beta$ in elevation degrees decreases rapidly with respect to increases in altitude of the aircraft. Thus, the voltage generated from the network 352 has greatest effect on the vertical sweep of the invention at lower altitudes as the aircraft begins to land. The waveform 508 is the function approximated by the shaping network 354, and it may be seen that the voltage output from network 354 increases linearly with respect to altitude until about 425 feet, after which the voltage increases at a reduced rate at higher altitudes. The voltage generated from the network 354 thus has primary effect on the vertical sweep of the signals of the invention at higher altitudes.

Waveform 510 is a function approximated by the waveshaping network 356, and it may be seen that the voltage output generated by the network 356 has primary effect upon the vertical sweep of the invention at higher altitudes of the aircraft. The waveform 512 is representative of the output of the summing network 376 and represents a voltage required to maintain the sum of the outputs of all the shaping networks equal to a voltage corresponding to an elevation degree $\beta$ of 12.1°. It may be seen that the output of the summing network 376 has primary influence at altitudes between 100 and 400 feet.

The effect of the waveforms shown in FIG. 18, as simulated by the waveshaping networks 352, 354, 356 and 376 in the manner shown in FIG. 12, is to approximate the nonlinear curves shown in FIG. 17 during operation of the present system.

FIGS. 19a–d illustrate four representations of an airport runway at varying altitudes and ranges, during display on the present radarscope display system. In the preferred embodiment, the radarscope of the invention utilizes a 5 inch diameter direct view storage tube with a usable display area of about four inches. Only the usable display area is illustrated in FIGS. 19a–d, and it will be understood that the illustrations are only approximations of the actual displays. For instance, in the actual radarscope display, the airport runway will generally be displayed as a dark target in a light colored field.

The horizontal scale of the radarscope is calibrated from the center to +15° on the righthand side and to −15° on the lefthand side thereof. The scope vertical scale is calibrated from zero at the horizon which is represented by line 513 and extends downwardly to 15° below the horizon. A dashed horizontal line 514 represents the glideslope 2.5° below the horizon in order to illustrate the touchdown on the runway. In the aircraft approach situation illustrated in the displays in FIGS. 19a–d, the glideslope of the aircraft is 2.5° and there is zero drift angle, heading error and touchdown offset.

Figure 19:
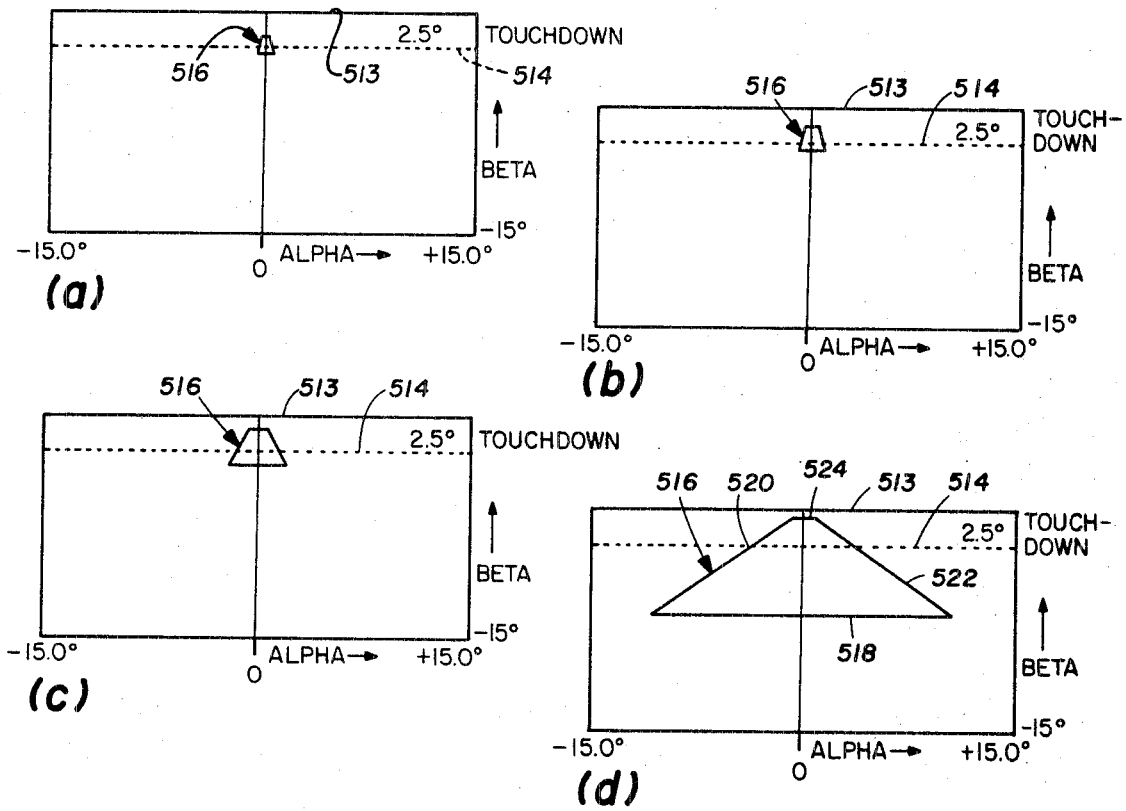

FIG. 19a illustrates a 150 feet wide airport runway 516 at a range of two miles to touchdown and at an aircraft altitude of 530.9 feet. Actual use of the present system has shown that the view of the airport 516 on the radarscope is strikingly similar to the view of the airport seen by the pilot through the cockpit window. FIG. 19b illustrates the runway 516 at a range of 1 mile to touchdown and at an aircraft altitude of 265.5 feet. FIG. 19c illustrates a view of the airport runway 516 at a closer range to touchdown of one-half mile and at an aircraft altitude of 132.7 feet. The dotted line 514 clearly illustrates the touchdown point upon the runway. FIG. 19d illustrates a view of the runway 516 at a range to touchdown of 0.19 mile and at an aircraft altitude of 50.4 feet.

Throughout the various views shown in FIGS. 19a–d of the airport runway, it will be seen that the present display corresponds directly to the real-world perspective view of the runway from the aircraft. Specifically, as shown in FIG. 19d, a visual airport runway indication is shown with a straight forward runway edge 518 having straight line runway sides 520 and 522 converging toward a rear runway edge 524 according to real-world linear perspective.

It should be understood that if the aircraft is laterally offset with respect to the runway during approach, that the runway will be laterally offset from the vertical center line on the radarscope and that the shape of the runway will be correspondingly varied to simulate the real-world view of the aircraft from the lateral offset distance. Additionally, if the aircraft approaches the runway at a crab angle, the shape of the runway will clearly indicate to the pilot that the approach is not optimum. Moreover, if the aircraft is at an undesirable roll attitude, the scope will illustrate to the pilot that the runway is disposed at an angle about the roll axis. It will also be understood that the upper portion of the circular radarscope above the horizontal line 512 will be representative of the sky due to control of the sweeps of the radarscope by the symbology, sky and range mark generator 402 shown in FIG. 12. Range markings will be displayed on the radarscope to the right of the illustrated displays on FIGS. 19a–d in order to provide range indications. Such range marks are also generated by the generator 402 in a manner previously described. For a disclosure of a suitable range tracking system for generation of the range signals to generator 402, reference is made to the previously noted copending patent application Ser. No. 055,165, filed July 15, 1970 and entitled "Range Tracking System for Use in an Independent Aircraft Landing Monitor."

FIG. 20 illustrates in schematic detail the shaping networks for generating the waveforms utilized to control the nonlinear vertical sweep of the present radarscope. FIG. 20 illustrates in greater detail the structure shown in block diagram form in FIG. 12 and identified as circuits 350–356 and 376. An altitude signal representative of the aircraft altitude is fed to terminal 550 and is applied to an input of an operational amplifier 552. The signal is passed through a filtering network generally identified by numeral 554 for filtering thereof.

Amplifier 552 includes a Zener diode 556 and other associated diodes connected thereacross in order to limit the signals passed there to an aircraft altitude of 50 feet previously developed. This limited signal is fed to an input of an amplifier 558. The altitude limited signal is also input to an amplifier 560. Diodes and associated circuitry connected to the amplifier 560 limit the effective altitude passed therethrough to a maximum of 600 feet. This maximum amplitude limited signal is fed to a summing point 562 where it is combined with the output of the 50 feet altitude limited signal. A filter network 564 is connected across the amplifier 558 to provide filtering to the amplitude limited signal.

The signal is then fed simultaneously into the inputs of amplifiers 566, 568 and 570. The limited and filtered signal is also fed via lead 572 to the inputs of amplifiers 574 and 576. A positive voltage is fed from a terminal 578 through resistive networks for addition to the input signals fed to the amplifiers 574 and 576. Associated circuitry, and in particular diodes 580 and 582, enable the amplifiers 574 and 576 to operate as half-wave rectifier circuits. The rectified output signals from the two circuits are combined at summing point 584 and are fed to the input of an amplifier 586. An adjustable resistance network 588 enables the initial voltage setting of the circuits to be made. The two half-wave rectifier circuits provide dead zones in the operation of the circuitry, such that the signal outputs thereof do not rise above zero until a predetermined voltage input level is applied thereto. Amplifier 586 and its associated circuitry is linear only up to zero voltage and will pass only negative-going signals for application to an input of an amplifier 590. The output of the amplifier 590 thus results in a voltage which is relatively high for low altitude inputs at terminal 550, but which falls sharply in amplitude upon increasing amplitude signals. The output of the amplifier 590 is thus representative of the waveform 506 shown in FIG. 18.

The output from the amplifier 558 is applied to amplifier 568, which comprises a linear inverting amplifier, the output of which is a linear positive voltage. The altitude signal is also applied to the amplifier 570 which is connected with diodes in an ideal one-half wave rectifier configuration, the output of which is negative voltage clamped. In other words, the voltage output remains at zero volts until the input voltage increases to a predetermined threshold. Upon the input voltage passing the predetermined threshold, a negative-going output voltage is generated via lead 592 which tends to cancel voltage from the input of amplifier 568. The resulting waveform is fed through an amplifier 594 which generates a shaped voltage representative of the waveform 508 shown in FIG. 18.

The limited and filtered altitude signals are also applied to the amplifier 566 which generates a positive-going voltage ramp which increases with altitude. The output of the amplifier 566 is thus a shaped voltage which is representative of the voltage 510 shown in FIG. 18.

The output from amplifiers 566, 590 and 594 is fed to a summing point 598. A positive voltage is applied to a resistive network to supply a reference voltage via resistor 599 to the summing point 598. The voltage applied via resistor 599 is representative of a maximum elevation angle of 12.1°. The resulting voltage signal is applied to amplifier 600 which then generates a shaped voltage representative of the waveform 512 shown in FIG. 18.

In the preferred embodiment of the invention, each of the illustrated amplifiers shown in FIG. 20 comprises the SN52709 integrated circuit amplifier manufactured and sold by Texas Instruments Incorporated.

Referring to FIG. 21, a detailed schematic circuit is shown of the voltage controlled delay 398 and the sweep width one-shot multivibrator 400 previously described in FIG. 12. The premaster trigger (PMT) signal is fed to terminal 601 and is applied across a parallel connected diode to an input of a gate 602. The output of gate 602 is applied to an input of gate 604, the input of which is interlocked with the output of a gate 606. Gates 602, 604, and 606 operate as an RS flip-flop circuit, the output of which is applied via lead 608 to the base of a transistor 610. The base of a transistor 612 is connected to a resistance to the collector of transistor 610, and the collector of transistor 612 is applied across a capacitor and a Zener diode to the input of a comparator circuit 614.

The collector of transistor 612 is also connected to the collector of a transistor 616. The output generated from the transistors 610, 612 and 616 is a ramp function which is applied to the comparator 614. This ramp function is compared by the comparator 614 against an amplified altitude signal applied via terminal 620, through an amplifier 622 and via lead 624 to a second input of the comparator circuit 614. The output of the comparator 614 is applied to a NAND gate 626, the second input of which is connected to receive the PMT signal. The output of gate 626 controls the operation of a gate 628 in accordance with the PMT signal. The output from gate 628 is applied to control the triggering of the sweep width one-shot multivibrator 400 previously described in FIG. 12.

Multivibrator 400 thus generates an output signal to the base of a transistor 630, a signal thus appearing on the collector of 630 which operates the clamps shown in FIG. 12. The signal is termed the real-world unblank signal. The output of the sweep width one-shot multivibrator 400 is also applied via lead 632 to the inputs of NAND gates 634 and 636. The outputs of gates 634 and 636 are applied to a NAND gate 638, the output of which is connected back to the inputs of gates 634 and 636. Gates 634–638 operate as a digital differentiator. The output from the differentiator is applied via lead 640 to an input of gate 606. The trailing edge of the pulse generated from the multivibrator 400 is thus detected by the differentiator and the resulting output from the differentiator resets the RS flip-flop comprising gates 602–606. When the flip-flop is set, a linear ramp is initiated from the ramp generation circuitry and the ramp voltage is compared by the comparator circuit 614 with the altitude input. When the ramp exceeds the altitude voltage, the desired delay time has occurred and the multivibrator 400 is triggered in order to generate the real-world unblank signal.

FIG. 22 illustrates in schematic detail the R-C storage circuitry, the clamp circuitry and the summing amplifier 390 previously illustrated in FIG. 12. The storage capacitor 382 and the diode clamp 384 have been omitted for clarity of illustration.

The real-world unblank signal generated by the circuitry of FIG. 21 is applied to terminals 700 and 702. The real-world unblanking signal fed to the terminal 702 is applied to the base of a transistor 704, the collector of which is coupled to the base of a transistor 706. The emitter of transistor 706 is coupled across a Zener diode and a capacitor to the emitter of a transistor 708. The base of transistor 708 is coupled through an R-C network to the collector of transistor 704. The collector of transistor 706 is applied through a resistance 710 to the base of a transistor 712. The collector of transistor 712 is applied through a diode 714 to one terminal of a diode bridge 716.

The collector of transistor 708 is applied through a diode 718 to an opposite terminal of the diode bridge 716. Diode bridge 716 corresponds directly to the diode clamp 362 disclosed in FIG. 12. The shaped voltage waveform 506 described in FIG. 18, and which was developed by circuitry shown in FIG. 20, is applied to terminal 720 and charges up an R-C storage circuit comprising capacitors 722 and resistors 724 and 726, when the clamp is unclamped. When the bridge 716 is unclamped, the voltage across the capacitors is fed via lead 728 to resistor 730. Resistor 730 is connected to a base of a transistor 732.

The real-world unblank signal is also applied through terminal 700 to the base of a transistor 736. The unblank signal is applied from the collector of transistor 736 through a diode 738 to the base of a transistor 740. The collector of transistor 740 is coupled to the base of a clamping transistor 742 and to the base of a clamping transistor 744. Transistor 742 corresponds directly to the transistor clamp 374 and transistor 744 corresponds directly to the transistor 368 shown in FIG. 12. The shaped voltage waveform 510 derived from the circuitry shown in FIG. 20 is applied to terminal 478 and charges up an R-C storage network comprising capacitor 750 and resistors 752 and 754, after the real-world unblank signal is applied to the transistor 742. The voltage across capacitor 750 is applied across resistor 758 connected to the base of transistor 732.

The shaped voltage waveform 508 derived from the circuitry shown in FIG. 20 is applied to terminal 760 and charges up an R-C storage network comprising capacitor 762 and resistors 764 and 766, when the transistor clamp 744 is unclamped. The voltage across the capacitor is applied via lead 770 to resistor 772 which is connected to the base of transistor 732.

The voltage charging up the fourth R-C storage network, not shown, is applied to terminal 780 and across resistor 782. A roll signal is applied to terminal 784 through a resistance to the base of transistor 732 in order to provide orientation of the display runway about the roll axis, as previously described with respect to FIG. 12.

As previously noted, the various charging time constants of the four R-C storage networks of the sweep generator operate to provide a sweep voltage which approximates an inverse time function. Additionally, the output voltages vary directly with altitude to thereby provide a vertical sweep driving signal according to equation (12).

The emitter of transistor 732 is connected to the base of a transistor 390, and the collectors of transistors 732 and 790 are commonly connected to form a Darlington configuration. Similarly, transistors 792 and 794 are connected in a Darlington configuration to form a summing amplifier for the nonlinear signals applied thereto. Negative bias voltage is applied through a transistor 796 to the emitters of the opposed Darlington configurations for bias thereof.

The collectors of the transistors 732, 790, 892 and 794 are coupled to the base and collector of a transistor 800. The collector of transistor 790 is directly connected to the base of a transistor 802. The emitters of transistors 800 and 802 are coupled through resistances to the collector of a transistor 804, the base and emitter of which are coupled to a positive bias voltage.

The output from the summing amplifier is applied via lead 806 to the base of a transistor 808. The collector of transistor 808 is connected through a Zener diode 810 to a supply of positive bias voltage. Transistor 808 is connected in an emitter follower configuration to the base of a transistor 812. The emitter of transistor 812 is capacitively coupled to the base of a transistor 814. The emitter of transistor 814 supplies an inverted real-world sweep control signal via terminal 816. The emitter of transistor 808 is also directly coupled to a terminal 818 in order to supply the real-world vertical sweep control signal for nonlinear control of the vertical sweep of the radarscope in the manner previously described.

The signal generated upon the terminal 816 is a derivative of the real-world sweep which may be fed to the unblanking and intensity compensation circuitry for control thereof.

It may thus be seen that the present radar system provides a high azimuthal resolution for excellent runway definition during the landing approach of an aircraft, while maintaining system simplicity, reliability and reasonable cost. The present radar system has been found to provide excellent range performance in all types of weather, and the 0.4° beam width coupled with the expanding real-world perspective display provides excellent high resolution display of an approaching runway in heavy fog and high rainfall rates. The present independent sensor provides significant confidence to the pilot due to the direct independent contact with the approaching runway at reasonable ranges in order to achieve a solid category III capability in high speed jet aircraft.

The mechanical resonant scanner antenna of the invention provides excellent resolution, as well as providing stable electrical performance characteristics and consistent beam width, antenna gain and azimuth pointing performance. The present real-world perspective display provides excellent contrast between an airport runway and grass boundaries thereabout, and in one embodiment of the invention a contrast of on the order of 20 dB has been obtained. Good runway definition between the runway concrete and the adjacent grass is provided by the system for weather ranging from heavy fog to 4mm/hour rainfall.

In case of runway flooding or snow conditions which severely degrade or eliminate grass-runway contrast, the present radar system will display the runway lights to define the runway boundaries. Additionally, the runway lights may be augmented with specialized two-bounce corner reflectors. A suitable reflector would provide a two-bounce configuration to return the circularly polarized transmitted signal in the correct sense for reception by the present system.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An aircraft radar antenna comprising:
    an elongated housing for being mounted horizontally in an aircraft,
    an elongated horn reflector extending along the forward portion of said housing,
    a radar waveguide extending within said horn reflector for transmitting and receiving radar signals, said horn reflector forming an antenna radiation pattern narrower in the azimuth than in the elevation plane, motor means connected to oscillate said housing horizontally about a central vertical axis to sweep the antenna over an azimuth angle, and an elongated spring rigidly clamped in its center and having free ends for periodically storing and releasing energy during oscillation of said housing.

2. The antenna of claim 1 and further comprising:

a plurality of alternatively sloped slots formed along the length of said waveguide.

3. The antenna of claim 1 and further comprising:

means for sensing the instantaneous position of said housing, means for comparing the position of said housing with a preselected desired position, and means for generating a control signal to said motor means when said housing deviates from the preselected desired position.

4. The antenna of claim 1 wherein said antenna radiation pattern has an angle of approximately 17° in elevation.

5. The antenna of claim 1 wherein said antenna radiation pattern has an angle of less than 1° in azimuth.

6. The antenna of claim 1 wherein said housing is swept over an azimuth angle of approximately 30° for airport runway detection.

7. The antenna of claim 1 and further comprising:

polarizing means including a plurality of metal strips slanted to the horizontal and disposed in said horn reflector forward of said waveguide.

8. The antenna of claim 1 wherein said waveguide transmits radar signals in the Ka-band.

9. The antenna of claim 1 wherein said waveguide comprises:

a resonant edge-slotted waveguide array operable to transmit radar signals in the Ka-band.

10. A radar antenna for use in an independent aircraft landing monitor comprising:

an elongated antenna housing mounted on a vertical pivot for horizontal oscillation in an aircraft, an elongated horn reflector mounted along said housing, a resonant edge-slotted waveguide array extending within said horn reflector for transmitting and receiving radar signals with a radiation pattern narrower in the azimuth than in the elevation plane, means mounted in said horn reflector forward of said waveguide for circularly polarizing said radar signals, spring means mounted between said antenna housing and said vertical pivot, motor means for oscillating said antenna housing about said vertical pivot for sweeping the radiation pattern over a predetermined azimuth angle, and means for sensing the position of said antenna housing and for maintaining the antenna sweep at the predetermined azimuth angle.

11. The radar antenna of claim 10 wherein said spring means comprises:

an elongated bar spring rigidly connected at the center thereof to said vertical pivot and having free end portions slidably abutting said housing.

12. The radar antenna of claim 10 wherein said means for polarizing comprises:

a plurality of slanted wire members embedded in a dielectric support mounted in said horn reflector.

13. The radar antenna of claim 10 wherein said means for sensing comprises:

means for generating an electrical signal representative of antenna position, means for sensing the amplitude of said electrical signal at the peaks of antenna oscillation, and means responsive to said sensing means for generating control signals to said motor means for maintaining the antenna sweep at the predetermined azimuth angle.

14. The radar antenna of claim 13 wherein said means for sensing comprises:

means for phase shifting said electrical signal, detectors for generating signals when the phase shifted electrical signal passes through zero amplitude, and means responsive to said detectors for sampling the voltage magnitude of the electrical signal.

15. The radar antenna of claim 14 and further comprising:

means for generating driving pulses to said motor means, the width of said pulses being proportional to the amplitude of the sampled voltage magnitude of the electrical signal.

16. A mechanically swept radar antenna for use in an aircraft landing monitor comprising:

an antenna housing mounted for pivotal movement about a vertical axis on an aircraft, an elongated waveguide array extending along the length of said housing for directing a radar beam narrower in the azimuth than in the elevation plane, motor means for oscillating said housing about said vertical axis for sweeping said radar beam across a predetermined azimuth angle sufficient for airport runway detection during approach by the aircraft, means for generating an electrical signal representative of the antenna housing position, means for generating an error signal in response to comparison of the amplitude of said electrical signal against a preset value, and means responsive to said error signal for driving said motor means to maintain the desired antenna sweep.

17. The radar antenna of claim 16 and further comprising:

means for phase shifting said electrical signal, detectors for generating signals when the phase shifted electrical signal passes through zero amplitude, and means responsive to said detectors for sampling the voltage magnitude of the electrical signal.

18. The radar antenna of claim 17 and further comprising:

means for generating driving pulses to said motor means, the width of said pulses being proportional to the amplitude of the sampled voltage magnitude of the electrical signal.

* * * * *